United States Patent
Taquet et al.

(10) Patent No.: US 12,430,808 B2
(45) Date of Patent: Sep. 30, 2025

(54) METHOD AND APPARATUS OF QUANTIZING SPHERICAL COORDINATES USED FOR ENCODING/DECODING POINT CLOUD GEOMETRY DATA

(71) Applicant: Beijing Xiaomi Mobile Software Co., Ltd., Beijing (CN)

(72) Inventors: Jonathan Taquet, Beijing (CN); Sebastien Lasserre, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 188 days.

(21) Appl. No.: 18/258,856

(22) PCT Filed: Oct. 14, 2021

(86) PCT No.: PCT/CN2021/123908
§ 371 (c)(1),
(2) Date: Jun. 22, 2023

(87) PCT Pub. No.: WO2022/134761
PCT Pub. Date: Jun. 30, 2022

(65) Prior Publication Data
US 2024/0046528 A1 Feb. 8, 2024

(30) Foreign Application Priority Data
Dec. 23, 2020 (EP) .................................... 20306674

(51) Int. Cl.
*G06T 9/40* (2006.01)
(52) U.S. Cl.
CPC ..................... *G06T 9/40* (2013.01)

(58) Field of Classification Search
CPC ........................................................ G06T 9/40
See application file for complete search history.

(56) References Cited

U.S. PATENT DOCUMENTS

| 2018/0053324 A1* | 2/2018 | Cohen ..................... G06T 9/005 |
| 2019/0051017 A1 | 2/2019 | Beek |
| 2020/0175725 A1 | 6/2020 | Mekuria |

(Continued)

FOREIGN PATENT DOCUMENTS

| CN | 111699683 A | 9/2020 |
| WO | WO 2020248177 A1 | 12/2020 |

OTHER PUBLICATIONS

J. Taquet et al., (Xiaomi), "[G-PCC][New] Improved Quantization of Azimuthal Angle in Predictive Geometry Coding", International Organisation for Standardisation Organisation.

(Continued)

*Primary Examiner* — Michelle Chin
(74) *Attorney, Agent, or Firm* — Finnegan, Henderson, Farabow, Garrett & Dunner, L.L.P.

(57) ABSTRACT

There is provided methods and apparatus of encoding/decoding a point cloud into/from a bitstream of encoded point cloud data representing a physical object, each point of the point cloud being associated with spherical coordinates representing an azimuthal angle responsive to a capture angle of a sensor that captured the point and a radius responsive of a distance of the point from a referential. The encoding method includes adaptively quantizing a residual error azimuthal angle, derived from the azimuthal angle, based on the radius.

11 Claims, 20 Drawing Sheets

(56) References Cited

U.S. PATENT DOCUMENTS

| | | |
|---|---|---|
| 2020/0394822 A1 | 12/2020 | Gao et al. |
| 2021/0312670 A1* | 10/2021 | Mammou ................ G06T 9/40 |
| 2022/0398784 A1* | 12/2022 | Taquet ..................... G06T 9/40 |
| 2023/0328285 A1* | 10/2023 | Oh ........................ H04N 19/70 |
| | | 375/240.02 |

OTHER PUBLICATIONS

J. Taquet et al., (Xiaomi), "[G-PCC][New] Improved Quantization of Azimuthal Angle in Predictive Geometry Coding", International Organisation for Standardisation Organisation Internationale De Normalisation ISO/IEC JTC 1/SC 29/WG 7 Coding of Moving Pictures and Audio, ISO/IEC JTC 1/SC 29/WG 7 m55979, Jan. 2021, online, 10 pages.

European Patent Office, Extended European Search Report issued in Application No. 20306672.5 dated Jun. 8, 2021, 12 pages.

European Patent Office, Extended European Search Report issued in Application No. 20306673.3 dated Jun. 8, 2021, 8 pages.

International Search Report and Written Opinion of International Application No. PCT/CN2020/123908, dated Jan. 6, 2022, 8 pages.

\* cited by examiner ns head and some
METHOD AND APPARATUS OF QUANTIZING SPHERICAL COORDINATES USED FOR ENCODING/DECODING POINT CLOUD GEOMETRY DATA

CROSS-REFERENCE TO RELATED APPLICATION

The present application is a national phase entry of International Application PCT/CN2021/123908, filed on Oct. 14, 2021, which claims priority to European Patent Application No. EP20306674.1 filed on Dec. 23, 2020, the content of both of which is hereby incorporated by reference in its entirety into this disclosure.

FIELD

The present application generally relates to point cloud compression and, in particular to methods and apparatus of quantizing spherical coordinates for encoding/decoding point cloud geometry data captured by a spinning sensor head.

BACKGROUND

As a format for the representation of 3D data, point clouds have recently gained traction as they are versatile in their capability in representing all types of physical objects or scenes. Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allows for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

SUMMARY

According to a first aspect of the present application, there is provided a method of encoding a point cloud into a bitstream of encoded point cloud data representing a physical object, each point of the point cloud being associated with spherical coordinates representing an azimuthal angle responsive to a capture angle of a sensor that captured the point and a radius responsive of a distance of the point from a referential. The method includes adaptively quantizing a residual error azimuthal angle, derived from the azimuthal angle, based on the radius.

According to a second aspect of the present application, there is provided a method of decoding a point cloud from a bitstream of encoded point cloud data representing a physical object, each point of the point cloud being associated with spherical coordinates representing an azimuthal angle responsive to a capture angle of a sensor that captured the point and a radius responsive of a distance of the point from a referential. The method includes adaptively inverse quantizing a residual error azimuthal angle based on the radius.

According to a third aspect of the present application, there is provided an electronic device. The electronic device includes a processor; and a memory for storing instructions executable by the processor. The processor is configured to implement a method according to the first or second aspect of the present application.

The specific nature of at least one of the exemplary embodiments as well as other objects, advantages, features and uses of said at least one of exemplary embodiments will become evident from the following description of examples taken in conjunction with the accompanying drawings.

BRIEF DESCRIPTION OF THE DRAWINGS

Reference will now be made, by way of example, to the accompanying drawings which show exemplary embodiments of the present application, and in which.

Similar reference numerals may have been used in different figures to denote similar components.

DESCRIPTION OF EXEMPLARY EMBODIMENTS

Figure 1:
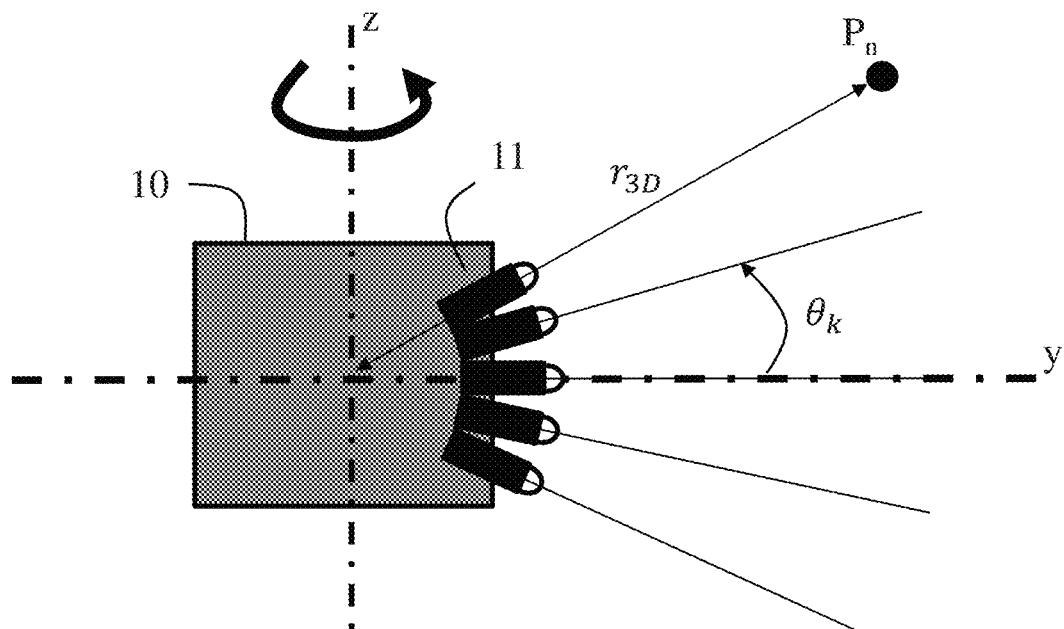
FIG. 1 illustrates a side view of a sensors head and some of its parameters in accordance with prior art.

At least one of the exemplary embodiments is described more fully hereinafter with reference to the accompanying figures, in which examples of at least one of the exemplary embodiments are illustrated. An exemplary embodiment may, however, be embodied in many alternate forms and should not be construed as limited to the examples set forth herein. Accordingly, it should be understood that there is no intent to limit exemplary embodiments to the particular forms disclosed. On the contrary, the disclosure is intended to cover all modifications, equivalents, and alternatives falling within the spirit and scope of the present application.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Virtual Reality (VR), Augmented Reality (AR) and immersive worlds have recently become a hot topic and are foreseen by many as the future of 2D flat video. The basic idea is to immerse the viewer in a surrounding environment, in contrast to a standard TV that only allows the viewer to look at the virtual world in front of him/her. There are several gradations in the immersivity depending on the freedom of the viewer in the environment. A point cloud is a good format candidate for distributing VR/AR worlds.

The automotive industry, and more particularly foreseen autonomous cars, are also domains in which point clouds may be intensively used. Autonomous cars should be able to "probe" their environment to make good driving decisions based on the detected presence and nature of their immediate nearby objects and road configuration.

A point cloud is a set of points located in a tridimensional (3D) space, optionally with additional values attached to each of the points. These additional values are usually called attributes. Attributes may be, for example, three-component colors, material properties like reflectance and/or two-component normal vectors to a surface associated with a point.

A point cloud is thus a combination of a geometry (locations of the points in a 3D space usually represented by 3D cartesian coordinates x,y and z) and attributes.

Point clouds may be captured by various types of devices like an array of cameras, depth sensors, lasers (light detection and ranging, also known as Lidars), radars, or may be computer-generated (for example in movie post-production). Depending on the use cases, points clouds may have from thousands to up to billions of points for cartography applications. Raw representations of point clouds require a very high number of bits per point, with at least a dozen of bits per cartesian coordinate x, y or z, and optionally more bits for the attribute(s), for instance three times 10 bits for the colors.

It is important in many applications to be able to either distribute point clouds to an end-user or store them in a server by consuming only a reasonable amount of bitrate or storage space, while maintaining an acceptable (or preferably very good) quality of experience. Efficient compression of these point clouds is a key point in order to make the distribution chain of many immersive worlds practical.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the subsequent analysis of the compressed and transmitted point cloud.

Until recently, point cloud compression (aka PCC) was not addressed by the mass market and no standardized point cloud codec was available. In 2017, the standardization working group ISO/JCT1/SC29/WG11, also known as Moving Picture Experts Group or MPEG, has initiated work items on point cloud compression. This has led to two standards, namely MPEG-I part 5 (ISO/IEC 23090-5) or Video-based Point Cloud Compression (V-PCC)

MPEG-1 part 9 (ISO/IEC 23090-9) or Geometry-based Point Cloud Compression (G-PCC)

The V-PCC coding method compresses a point cloud by performing multiple projections of a 3D object to obtain 2D patches that are packed into an image (or a video when dealing with dynamic point clouds). Obtained images or videos are then compressed using already existing image/video codecs, allowing for the leverage of already deployed image and video solutions. By its very nature, V-PCC is efficient only on dense and continuous point clouds because image/video codecs are unable to compress non-smooth patches as would be obtained from the projection of, for example, Lidar-captured sparse geometry data.

The G-PCC coding method has two schemes for the compression of a captured sparse geometry data.

The first scheme is based on an occupancy tree, being locally any type of tree among octree, quadtree or binary tree, representing the point cloud geometry. Occupied nodes are split down until a certain size is reached, and occupied leaf nodes provide the 3D locations of points, typically at the center of these nodes. The occupancy information is carried by occupancy flags signaling the occupancy status of each of the child nodes of nodes. By using neighbor-based prediction techniques, high level of compression of the occupancy flags can be obtained for dense point clouds. Sparse point clouds are also addressed by directly coding the position of point within a node with non-minimal size, by stopping the tree construction when only isolated points are present in a node; this technique is known as Direct Coding Mode (DCM).

The second scheme is based on a predictive tree in which each node represents the 3D location of one point and the parent/child relation between nodes represents spatial prediction from parent to children. This method can only address sparse point clouds and offers the advantage of lower latency and simpler decoding than the occupancy tree. However, compression performance is only marginally better, and the encoding is complex, relatively to the first occupancy-based method, because the encoder must intensively look for the best predictor (among a long list of potential predictors) when constructing the predictive tree.

In both schemes, attribute (de)coding is performed after complete geometry (de)coding, leading practically to a two-pass coding. Thus, the joint geometry/attribute low latency is obtained by using slices that decompose the 3D space into sub-volumes that are coded independently, without prediction between the sub-volumes. This may heavily impact the compression performance when many slices are used.

Combining together requirements on encoder and decoder simplicity, on low latency and on compression performance is still a problem that has not been satisfactorily solved by existing point cloud codecs.

An important use case is the transmission of sparse geometry data captured by a spinning Lidar mounted on a moving vehicle. This usually requires a simple and low-latency embarked encoder. Simplicity is required because the encoder is likely to be deployed on computing units which perform other processing in parallel, such as (semi-)autonomous driving, thus limiting the processing power available to the point cloud encoder. Low latency is also required to allow for fast transmission from the car to a cloud in order to have a real-time view of the local traffic, based on multiple-vehicle acquisition, and take adequate fast decision based on the traffic information. While transmission latency can be low enough by using 5G, the encoder itself shall not introduce too much latency due to coding. Also, compression performance is extremely important since the flow of data from millions of cars to the cloud is expected to be extremely heavy.

Specific priors related to spinning Lidar-captured sparse geometry data have been already exploited in G-PCC and have led to very significant gains of compression.

Figure 2:
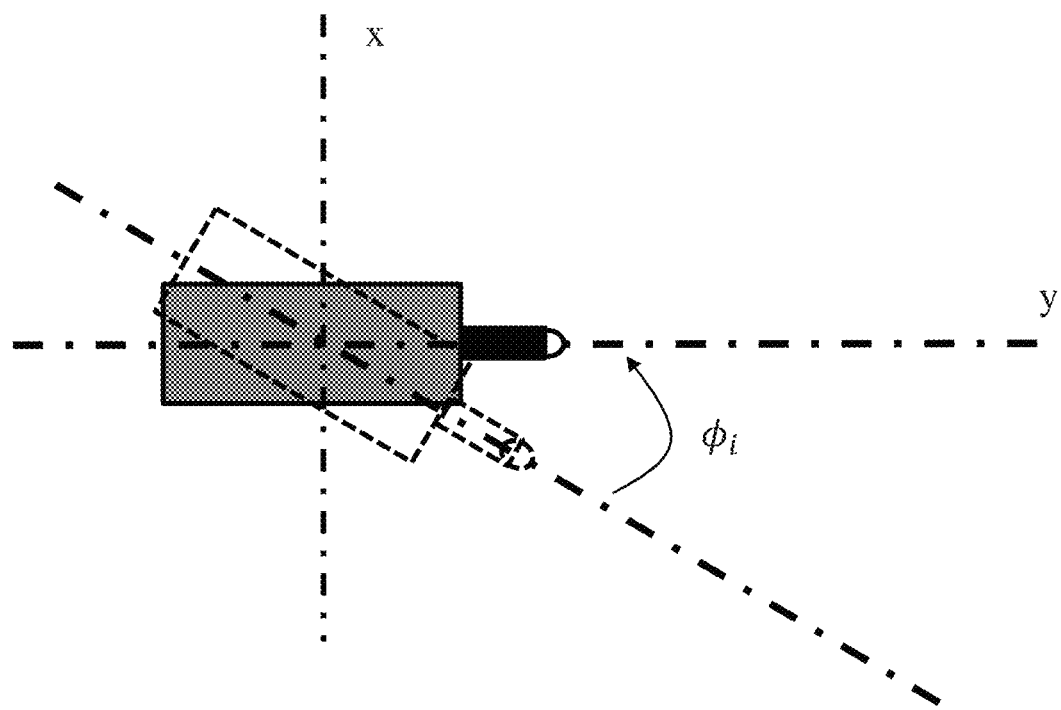
FIG. 2 illustrates a top view of the sensors head and some of its parameters in accordance with prior art.

First, G-PCC exploits the elevation angle (relative to the horizontal ground) of capture from a spinning Lidar head as depicted on FIGS. 1 and 2. A Lidar head 10 includes a set of sensors 11 (lasers), here five lasers are represented. The Lidar head 10 may spin around a vertical axis z to capture geometry data of a physical object. Lidar-captured geometry data is then represented in spherical coordinates $(r_{3D}, \phi, \theta)$, where $r_{3D}$ is the distance of a point P from the Lidar head's center, $\phi$ is an azimuthal angle of the Lidar head's spin relative to a referential, and $\theta$ is an elevation angle of a sensor k of the Lidar head relative to a horizontal referential plane.

Figure 3:
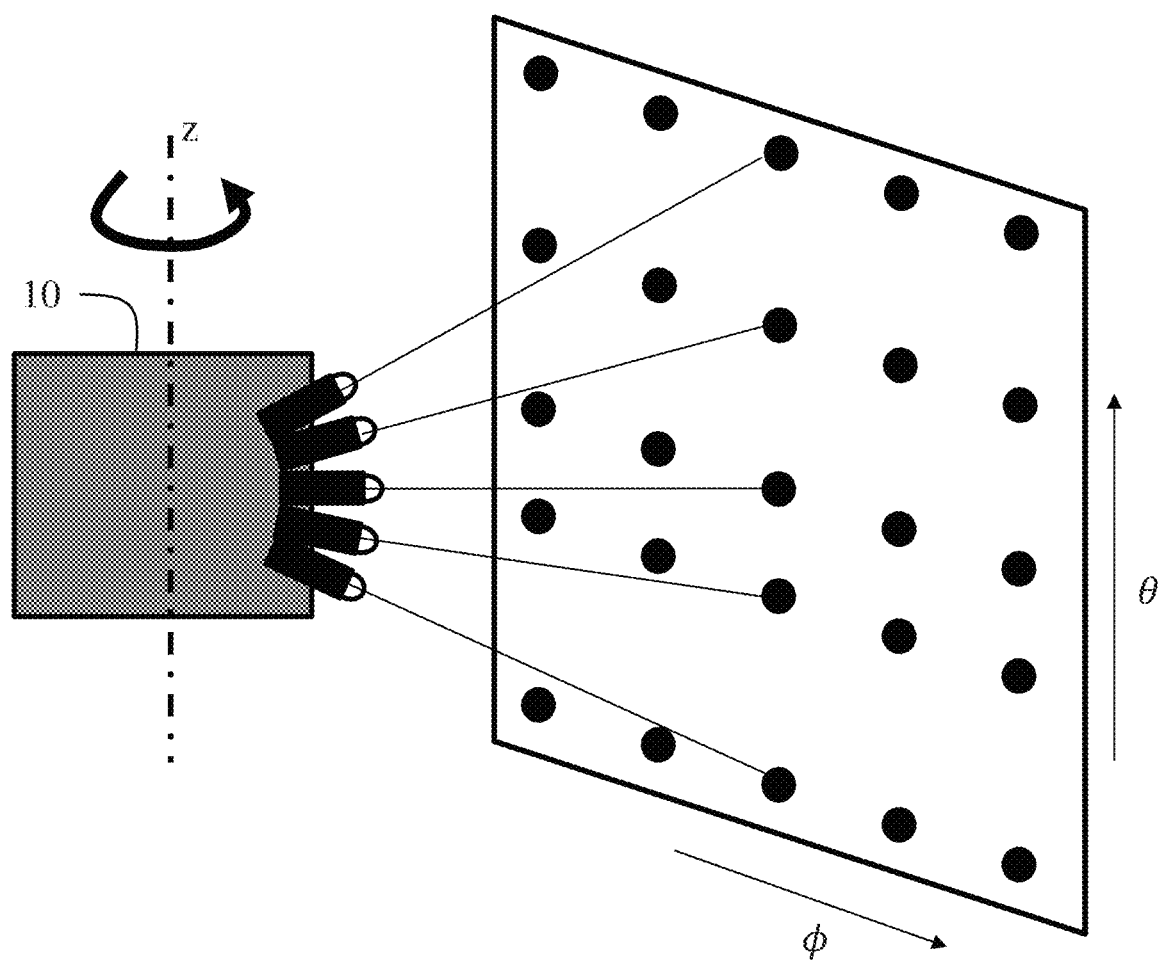
FIG. 3 illustrates a regular distribution of data captured by a spinning sensors head in accordance with prior art.

A regular distribution along the azimuthal angle has been observed on Lidar captured data as depicted on FIG. 3. This regularity is used in G-PCC to obtain a quasi 1D representation of the point cloud where, up to noise, only a radius $r_{3D}$ belongs to a continuous range of values while the angles $\phi$, and $\theta$ take only a discrete number of values $\phi_i \forall i=0$ to $I-1$ where I is a number of azimuthal angles used for the capture of the points and $\theta_k \forall k=0$ to $K-1$ where K is a number of sensors of the Lidar head 10. Basically, G-PCC represents Lidar-captured sparse geometry data on a 2D discrete angular plane $(\phi, \theta)$ as depicted on FIG. 3, together with a radius value $r_{3D}$ for each point.

This quasi 1D property has been exploited in G-PCC in both the occupancy tree and the predictive tree by predicting, in the spherical coordinates space, the location of a current point based on an already coded point by using the discrete nature of angles.

More precisely, the occupancy tree uses DCM intensively and entropy codes the direct locations of points within a node by using a context-adaptive entropy coder. Contexts are then obtained from the local conversion of the point locations into angular coordinates $(\phi, \theta)$ and from the location of these angular coordinates relative to discrete angular coordinates $(\phi_i, \theta_k)$ obtained from precedingly coded points. The predictive tree directly codes a first version of a point location in the angular coordinates $(r_{2D}, \phi, \theta)$, where $r_{2D}$ is the projected radius on the horizontal xy plane as depicted on FIG. 4, using the quasi 1D nature $(r_{2D}, \phi_i, \theta_k)$ of this coordinate space. Then, angular coordinates $(r_{2D}, \phi, \theta)$ are converted into 3D cartesian coordinates (x,y,z) and a xyz residual is coded to tackle the errors of coordinate conversion, the approximation of elevation and azimuthal angles and potential noise.

Figure 5:
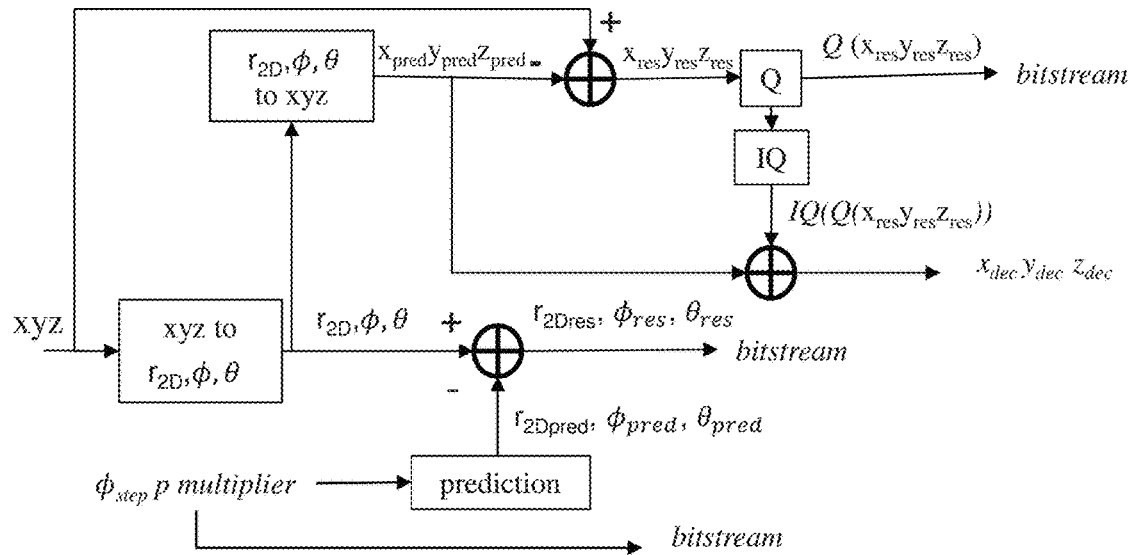
FIG. 5 illustrates a G-PCC predictive tree encoder in accordance with prior art.

FIG. 5 illustrates a G-PCC predictive tree encoder.

First, cartesian coordinates (x,y,z) of points of the point cloud are transformed into spherical coordinates $(r_{2D}, \phi, \theta)$ by $(x,y,z)=C2A(r_{2D}, \phi, \theta)$.

The transformation function C2A(.) is given by:

$$r_{2D}=\text{round}(\text{sqrt}(x*x+y*y)/\Delta I r_{2D})$$

$$\phi=\text{round}(\text{atan2}(y,x)/\Delta I \phi)$$

where round( ) is the rounding operation to the nearest integer value, sqrt( ) is the square root function and atan 2(y,x) is the arc tangent applied to y/x.

$\Delta I r_{2D}$ and $\Delta I_\phi$ are internal precisions for radiuses and azimuthal angles respectively. They are typically the same as their respective quantization steps, i.e. $\Delta I\phi=\Delta\phi$, and $\Delta I r_{2D}=\Delta r_{2D}$ with $$\Delta r_{2D}=2^M*\text{elementary quantization step}$$

where M is a parameter of the codec that may be signaled in a bitstream in a geometry parameter set, and where elementary quantization step is typically equal to 1. Typically, M may be 0 for lossless coding, and $$\Delta\phi = \frac{2*\pi}{2^N}$$

where N is a parameter of the encoder that may be signaled in a bitstream in a geometry parameter set. Typically, N may be 17 for lossless coding.

For sake of simplicity, $\Delta\phi=\Delta I\phi$ and $\Delta r_{2D}=\Delta I r_{2D}$ hereafter.

Next, cartesian coordinates $(x_{pred}, y_{pred}, z_{pred})$ are obtained by inverse transforming spherical coordinates $(r_{2D}, \phi, \theta)$:

$$(x_{pred}, y_{pred}, z_{pred})=A2C(r_{2D},\phi,\theta)$$

with $$r=r_{2D}*\Delta r_{2D}$$

$$x_{pred}=\text{round}(r*\cos(\phi*\Delta\phi))$$

$$y_{pred}=\text{round}(r*\sin(\phi*\Delta\phi))$$

$$z_{pred}=\text{round}(\tan(\theta)*r)$$

where sin( ) and cos( ) are sine and cosine functions. These two functions may be approximated by operations working on fixed-point precision. The values tan(θ) may be also stored as fixed-point precision values. Consequently, no floating-point operation is used in the decoder. Avoiding floating point operations is usually a strong requirement to ease the hardware implementations of codecs.

Predicted spherical coordinates ($r_{2Dpred}$, $\phi_{pred}$, $\theta_{pred}$) may be derived from known ancestors (parent, and up to great-grand-parent points/nodes) in the prediction tree. A prediction mode index may be signaled in the bitstream to inform the decoder of the selected prediction mode among a few allowed prediction modes. A predicted coordinate $\hat{\phi}_{pred}$ may be obtained by using a selected prediction mode and may be refined into $\phi_{pred}$ by additionally signaling in the bitstream a (positive or negative) integer p representing the number of elementary step $\phi_{step}$ to be added to the predicted coordinate $\hat{\phi}_{pred}$:

$$\phi_{pred} = \hat{\phi}_{pred} + P*\phi step$$

The elementary step $\phi_{step}$ may be coding parameter that may be signaled in a bitstream in a geometry parameter set with some fixed-point precision Δφ. The encoder may derive $\phi_{step}$ from the frequencies and rotation speed at which a spinning sensors head is performing capture at the different elevation angles, for example from the number of probing per head turn.

In a variant, no prediction index is signaled in the bitstream, and the predicted coordinate $\hat{\phi}_{pred}$ is obtained using a predetermined prediction mode. In one example, $\hat{\phi}_{pred}$ may be (0,0,0). In another variant, p is not signaled and is considered to be equal to 0.

Residual error spherical coordinates ($r_{2Dres}$, $\phi_{res}$, $\theta_{res}$) between original spherical coordinates and predicted spherical coordinates are then given by:

$$(r_{2Dres}, \phi_{res}, \theta_{res}) = (r_{2D}, \phi, \theta) - (r_{2Dpred}, \phi_{pred}, \theta_{pred})$$

and are lossless coded in the bitstream.

Predicted cartesian coordinates ($x_{pred}$, $y_{pred}$, $z_{pred}$) are obtained by inverse transforming reconstructed spherical coordinates ($r_{2D}$, φ, θ) by:

$$(x_{pred}, y_{pred}, z_{pred}) = A2C(r_{2D}, \phi, \theta)$$

Residual error cartesian coordinates ($x_{res}$, $y_{res}$, $z_{res}$) between the original points and predicted cartesian coordinates ($x_{pred}$, $y_{pred}$, $z_{pred}$) are given by:

$$(x_{res}, y_{res}, z_{res}) = (x, y, z) - (x_{pred}, y_{pred}, z_{pred})$$

Residual error cartesian coordinates ($x_{res}$, $y_{res}$, $z_{res}$) are quantized (Q) and quantized residual error cartesian coordinates Q($x_{res}$, $y_{res}$, $z_{res}$) are encoded into the bitstream. Residual error cartesian coordinates may be lossless coded when x,y,z quantization steps are equal to the original point precision (typically 1), or lossy coded when quantization steps are larger than the original point precision (typically quantization steps larger than 1).

Reconstructed cartesian coordinates ($x_{dec}$, $y_{dec}$, $z_{dec}$), as by a decoder, are given by:

$$(x_{dec}, y_{dec}, z_{dec}) = (x_{pred}, y_{pred}, z_{pred}) + IQ(Q(x_{res}, y_{res}, z_{res}))$$

where IQ(Q($x_{res}$, $y_{res}$, $z_{res}$)) represent de-quantized quantized residual error cartesian coordinates.

Those reconstructed cartesian coordinates ($x_{dec}$, $y_{dec}$, $z_{dec}$) may be used by the encoder for example for ordering (decoded) points before attribute coding.

Figure 6:
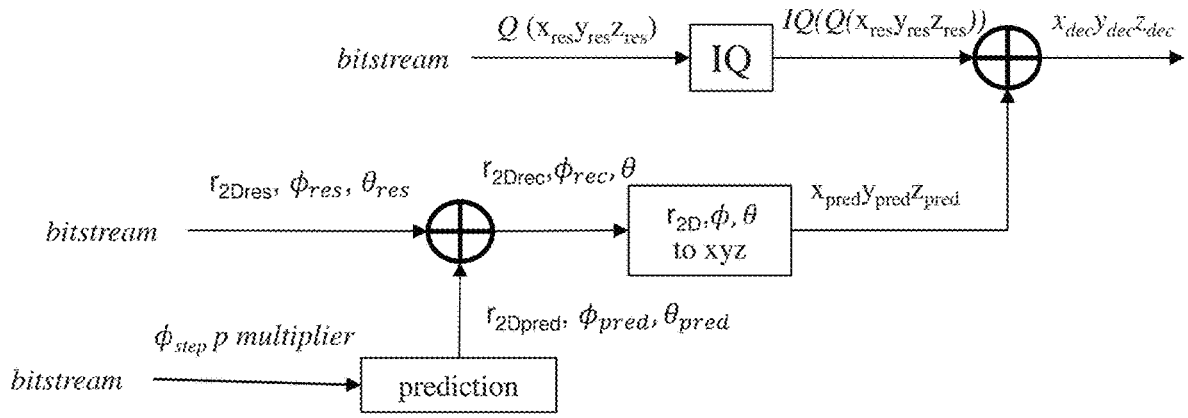
FIG. 6 illustrates a G-PCC predictive tree decoder in accordance with prior art.

FIG. 6 illustrates a G-PCC decoder for the predictive tree.

Predicted spherical coordinates ($r_{2Dpred}$, $\phi_{pred}$, $\theta_{pred}$) may be derived, as explained in FIG. 5, from information from the bitstream such as residual error spherical coordinates ($r_{2Dres}$, $\phi_{res}$, $\theta_{res}$) and optionally a prediction mode index.

Optionally, the number p of elementary steps $\phi_{step}$ to be added to the predicted coordinate $\hat{\phi}_{pred}$ is obtained from the bistream and the predicted coordinate $\phi_{pred}$ is derived as explained in FIG. 5.

Reconstructed spherical coordinates ($r_{2Drec}$, $\phi_{rec}$, θ) are obtained by adding residual error spherical coordinates decoded from the bitstream, and predicted spherical coordinates ($r_{2Dpred}$, $\phi_{pred}$, $\theta_{pred}$):

$$(r_{2Drec}, \phi_{rec}, \theta) = (r_{2Dpred}, \phi_{pred}, \theta_{pred}) + (r_{2Dres}, \phi_{res}, \theta_{res})$$

Predicted cartesian coordinates ($x_{pred}$, $y_{pred}$, $z_{pred}$) are obtained by inverse transforming reconstructed spherical coordinates ($r_{2Drec}$, $\phi_{rec}$, θ) by:

$$(x_{pred}, y_{pred}, z_{pred}) = A2C(r_{2D}, \phi_{rec}, \theta)$$

Quantized residual error cartesian coordinates Q($x_{res}$, $y_{res}$, $z_{res}$) are decoded, inverse quantized (IQ) and added to the Predicted cartesian coordinates ($x_{pred}$, $y_{pred}$, $x_{pred}$)

$$(x_{dec}, y_{dec}, z_{dec}) = (x_{pred}, y_{pred}, z_{pred}) + IQ(Q(x_{res}, y_{res}, z_{res}))$$

DCM has been introduced to allow occupancy tree-based codecs to obtain somewhat low complexity coding of sparse LiDAR point clouds by intensively using DCM coded points for faster compression of the isolated point. On the other hand, predictive tree-based encoder can be designed to directly process the points in the order they are captured by a spinning sensors head and builds efficient predictive tree without systematically searching for an optimal predictors.

G-PCC uses uniform quantization both on azimuthal angle φ and radius $r_{2D}$.

Figure 7:
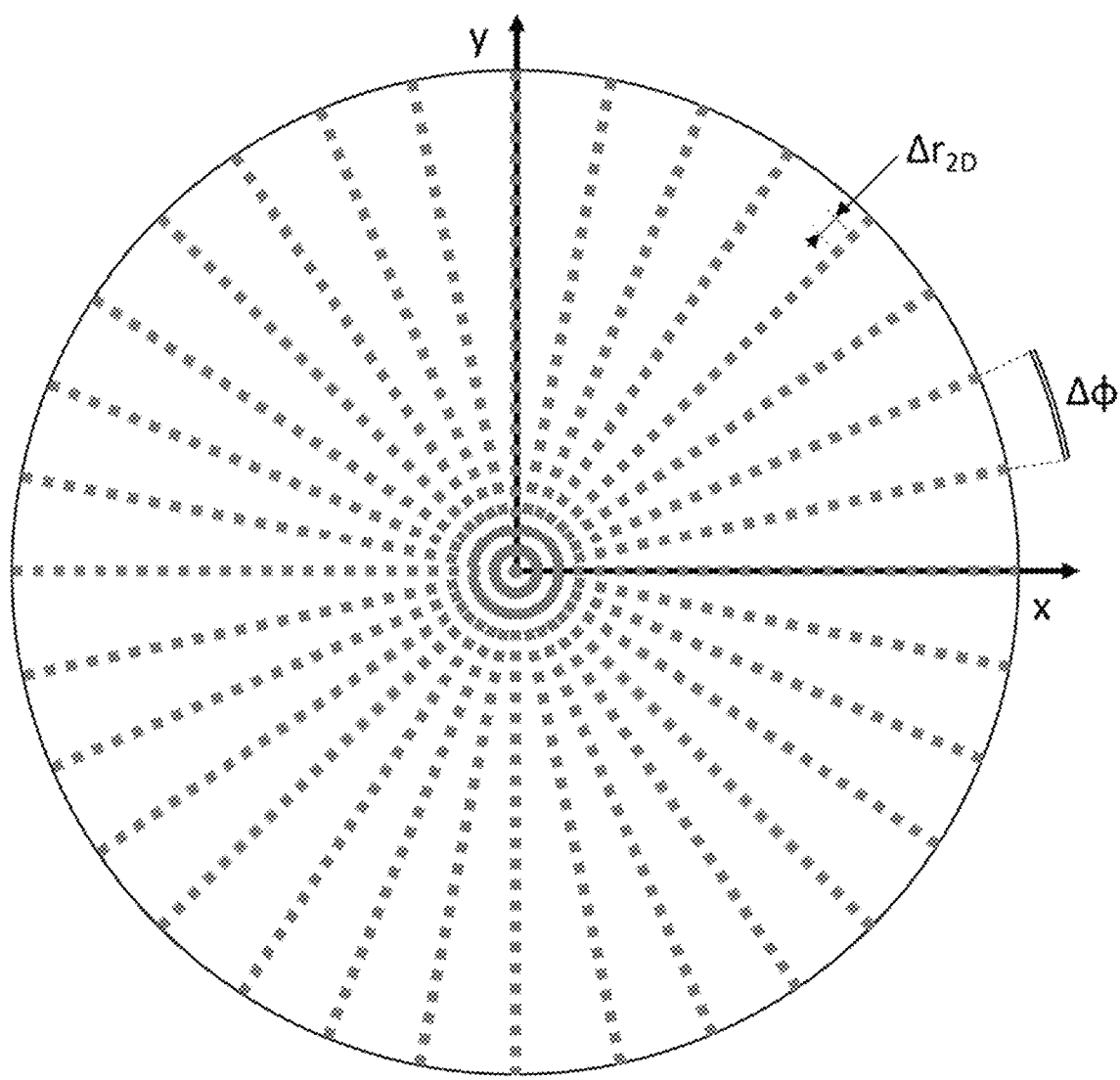
FIG. 7 illustrates sampling of azimuthal angles and the radius associated with point locations in a 2D space by using uniform quantization in accordance with prior art.

FIG. 7 illustrates a non-uniform sampling of the points in the (x, y) 2D space when using a uniform quantization/precision on an azimuthal angle φ (a spherical coordinate) with a quantization step (or precision) Δφ and a uniform sampling of radius $r_{2D}$ (another spherical coordinate) with a quantization step $\Delta r_{2D}$. It shows that the sampling density is high close to the origin, where a spinning sensors head is located, and becomes low in regions far from the spinning sensors head.

Figure 8:
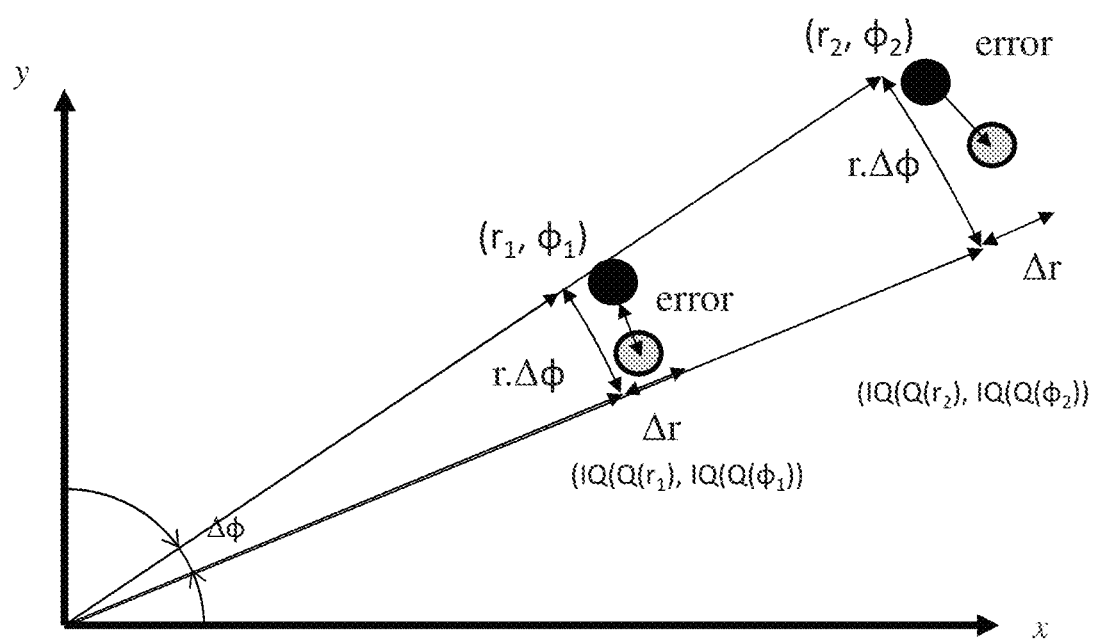
FIG. 8 illustrates impact on error/precision in a 2D space when azimuthal angles and radius are uniformly quantized in accordance with prior art.

FIG. 8 also illustrates non-uniformity of the reconstruction error in the (x, y) space after applying quantization Q(.) and inverse quantization IQ(.) both using uniform quantization steps Δφ and $\Delta r_{2D}$.

Depending on the value one gets either too much precision for points ($r_1$, $\phi_1$) close to the spinning sensors head or not enough precision for points ($r_2$, $\phi_2$) far away.

In the first case, there is too much coded information the residual error azimuthal angle $\phi_{res}$ (residual error spherical error) for close points. On the other hand, in the second case, there is not enough information coded for the residual error azimuthal angle $\phi_{res}$ of faraway points to have accurate precision on inverse transformed ($x_{pred}$, $y_{pred}$) values, thus leading to high magnitude residual error cartesian coordinates ($x_{res}$, $y_{res}$) to be coded. In both cases, the compression of the azimuthal angle φ is not optimal.

The uniform spherical sampling/quantization Δφ, $\Delta r_{2D}$ does not lead to optimal representation of the point positions when considering the overall compression scheme of points in cartesian space.

The problem to solve is, in the framework of encoding/decoding points of a point cloud captured by a spinning sensors head, to improve the compression efficiency (in bitrate for a given quality, or in quality for a given bitrate)

by reducing the quantization sub-optimality due to uniform quantization steps used in the spherical coordinate representation of the points of the point cloud.

At least one exemplary embodiment of the present application has been devised with the foregoing in mind.

At least one of the aspects generally relates to point cloud encoding and decoding, and at least one other aspect generally relates to transmitting a bitstream generated or encoded.

Moreover, the present aspects are not limited to MPEG standards such as MPEG-I part 5 or part 9 that relate to the Point Cloud Compression, and may be applied, for example, to other standards and recommendations, whether pre-existing or future-developed, and extensions of any such standards and recommendations (including MPEG-I part 5 and part 9). Unless indicated otherwise, or technically precluded, the aspects described in the present application may be used individually or in combination.

Adaptively quantizing azimuthal angles $\phi$ associated with points of a point cloud provides a more uniform sampling/quantization in the cartesian (x,y) space leading to an increase in compression performance.

According to an exemplary embodiment, a radius $r_{2D}$ (spherical coordinate of a point of a point cloud) is uniformly quantized and the azimuthal angle $\phi$ (spherical coordinate of a point of a point cloud) is adaptively quantized by using an adaptive angular quantization step $\Delta\phi(r2D)$ given by:

$$\Delta\phi(r2D)=\Delta\phi_{arc}/r_{2D}$$

where $\Delta\phi(r2D)$ is a non-uniform quantization step.

Figure 9:
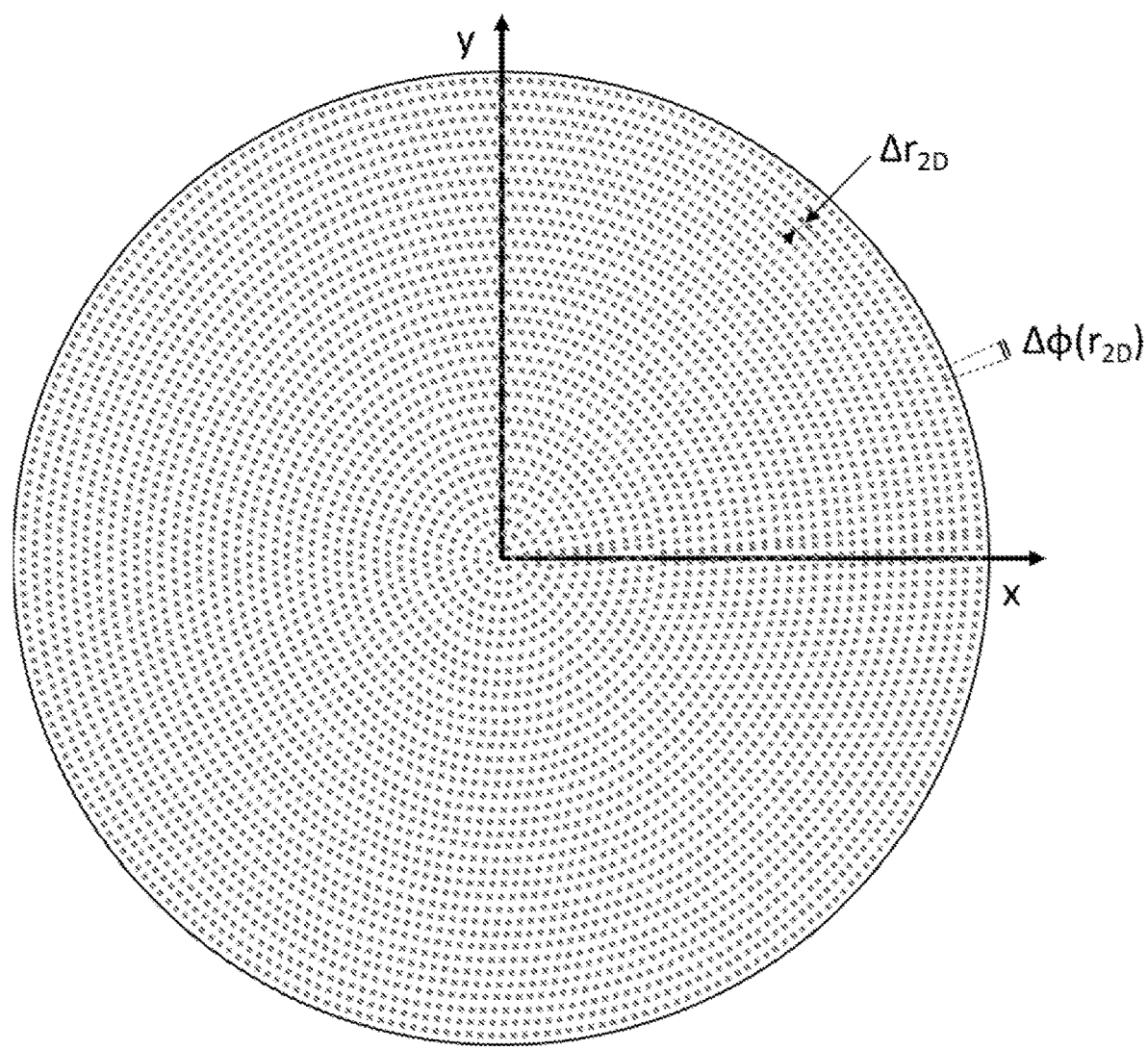
FIG. 9 illustrates non-uniform quantizing of the azimuthal angles, leading to uniform quantization of arcs in accordance with an at least one exemplary embodiment.
Figure 10:
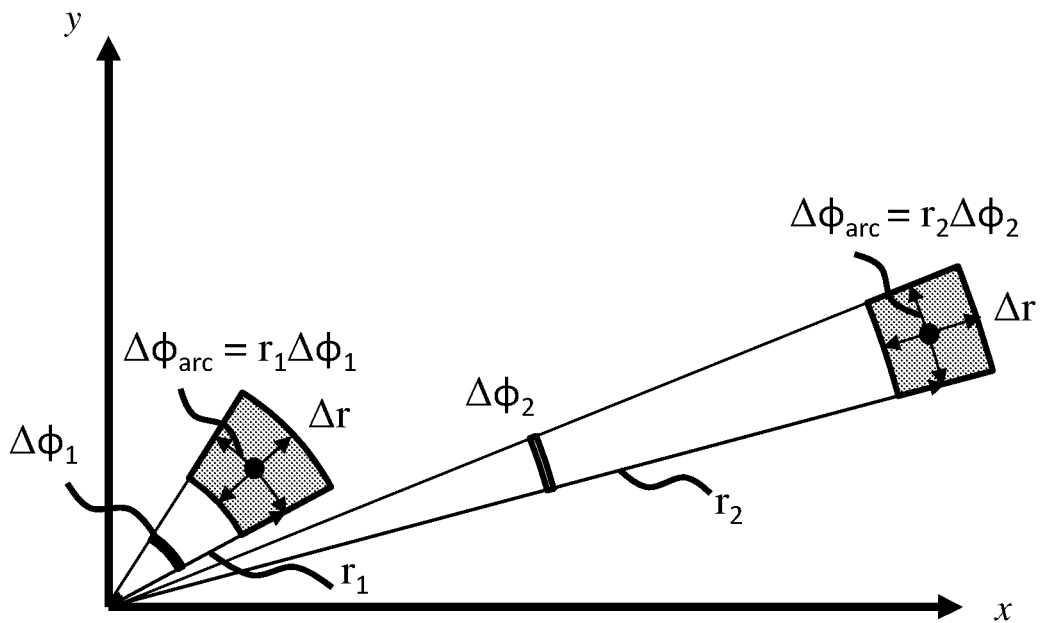
FIG. 10 illustrates independency of the uniform quantizing of circular arcs $\Delta\phi_{arc}$ in accordance with at least one exemplary embodiment.
Figure 11:
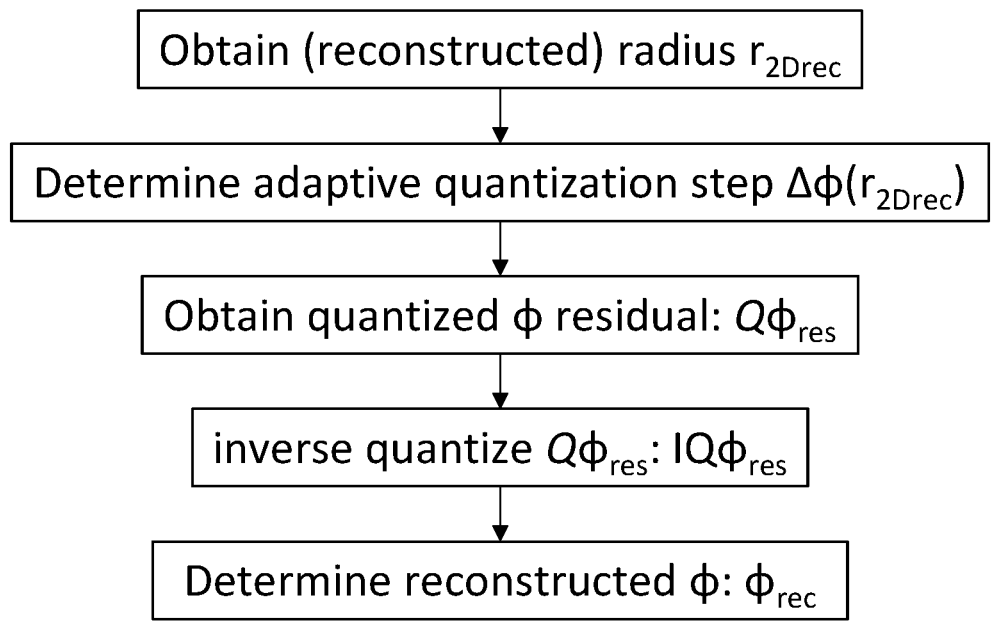
FIG. 11 illustrates a block diagram of steps of a method of adaptively quantizing the azimuthal angles in accordance with at least one exemplary embodiment.

This exemplary embodiment keeps uniform quantizing of circular arcs $\Delta\phi_{arc}$, i.e. keeps uniform quantization/sampling along the circles obtained for each quantized radius, as is illustrated in FIG. 9 and FIG. 10 where, by using this non-uniform quantization step, the quantized length of arcs $\Delta\phi_{arc}$ is uniform for any radius $r_1$, $r_2$ as this length is equal to $r_1*\Delta\phi(r_1)=\Delta\phi_{arc}=r_2*\Delta\phi(r_2)$ FIG. 11 illustrates a block diagram of steps of a method of adaptively quantizing the azimuthal angles in accordance with at least one exemplary embodiment.

A reconstructed radius $r_{2Drec}$ is obtained as explained in relation with FIG. 6. Next, the reconstructed radius $r_{2Drec}$ is used to adaptively determine an adaptive quantization step $\Delta\phi(r_{2Dec})$. Then, a residual error azimuthal angle $\phi_{res}$ is obtained by the difference between an original azimuthal angle $\phi$ and a predicted azimuthal angle $\phi_{pred}$ as explained in relation with FIG. 5. A quantized residual error azimuthal angle $Q\phi_{res}$ is then obtained by:

$$Q\phi_{res}=Q_\phi(\phi_{res},r_{2Drec})=\text{round}(\phi_{res}/\Delta\phi(r_{2Drec}))$$

where $Q_\phi$ is an adaptive quantizer based on the radius $r_{2Drec}$.

The quantized residual error azimuthal angle $Q\phi_{res}$ may be obtained by:

$$Q\phi_{res}=Q_\phi(\phi_{res},r_{2Drec})=\text{round}(\phi_{res}*r_{2Drec}*(1/\Delta\phi_{arc}))$$

using fixed-point precision arithmetic, and with the operation round( ) rounding the fixed-point representation to the nearest integer.

An inverse quantized residual error azimuthal angle $IQ\phi_{res}$ may be obtained by inverse quantizing $Q\phi_{res}$ by:

$$IQ\phi_{res}=IQ_\phi(Q\phi_{res},r_{2Drec})=Q\phi_{res}*\Delta\phi(r_{2Drec})$$

where $IQ_\phi$ is an adaptive inverse quantizer based on the radius $r_{2Drec}$.

The inverse quantized residual error azimuthal angle $IQ\phi_{res}$ may be obtained by:

$$IQ\phi_{res}=Q\phi_{res}*1(r_{2Drec}*(1/\Delta\phi_{arc}))$$

using fixed-point precision arithmetic, so that the inverse quantized residual error azimuthal angle $IQ\phi_{res}$ is obtained with the internal precision $\Delta I\phi$.

In some variants the inverse function (i.e. inv(x)=1/x) may be approximated by less complex operations like multiplications and/or bitwise shift operation and/or additions/subtractions.

The inverse quantized residual error azimuthal angle $IQ\phi_{res}$ may then be used to determine a reconstructed azimuthal angle $\phi_{rec}$ by:

$$\phi_{rec}=\phi_{pred}+IQ\phi_{res}$$

In a variant, a quantized azimuthal angle $Q\phi$ is obtained for an azimuthal angle $\phi$ by:

$$Q\phi=Q_\phi(\phi,r_{2Drec})=\text{round}(\phi/\Delta\phi(r_{2Drec}))$$

An inverse quantized azimuthal angle $IQ\phi$ may be obtained by inverse quantizing $Q\phi$ by:

$$IQ\phi=IQ\phi(Q\phi,r_{2Drec})=Q\phi*\Delta\phi(r_{2Drec})$$

The reconstructed azimuthal angle $\phi_{rec}$ is equal to $IQ\phi$.

The quantized azimuthal angle $Q\phi$ may be signaled in the bitstream.

In a variant, instead of signaling the quantized azimuthal angle $Q\phi$, a residual error quantized azimuthal angle $Q\phi'_{res}$ may be signaled in the bitstream. $Q\phi'_{res}$ is obtained by the difference between a prediction of the quantized azimuthal angle $Q\phi_{pred}$ and the quantized azimuthal angle $Q\phi$. Prediction of the quantized azimuthal angle $Q\phi_{pred}$ may be obtained by deriving a predicted spherical coordinate $\phi_{pred}$ as explained in relation with FIG. 5 and by using the adaptive quantizer $Q_\phi$ to quantize it based on the reconstructed radius $r_{2Drec}$:

$$Q\phi_{pred}=Q_\phi(\phi_{pred},r_{2Drec})$$

The reconstructed azimuthal angle $\phi_{rec}$ may then be determined by:

$$\phi_{rec}=IQ_\phi(Q'\phi_{res}+Q\phi_{pred},r_{2Drec})$$

Or, in a variant, by:

$$\phi_{rec}=IQ_\phi(Q\phi_{pred},r_{2Drec})+IQ_\phi(Q\phi'_{res},r_{2Drec})$$

Or, in another variant, by:

$$\phi_{rec}=\phi_{pred}+IQ_\phi(Q\phi'_{res},r_{2Drec})$$

Figure 12:
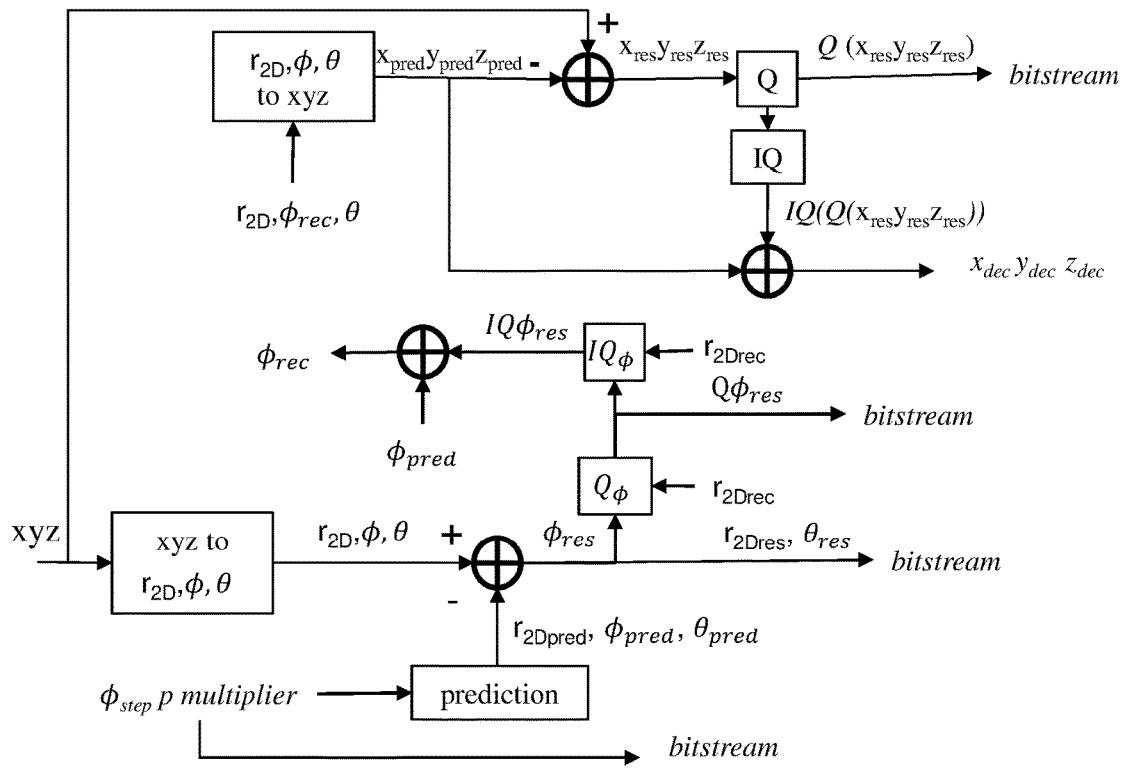
FIG. 12 illustrates adaptively quantizing an azimuthal angle in a G-PCC encoder accordance with at least one exemplary embodiment.

FIG. 12 illustrates adaptively quantizing of an azimuthal angle in a G-PCC encoder in accordance with at least one exemplary embodiment.

Compared to the G-PCC encoder described in relation with FIG. 5, the residual error azimuthal angle $\phi_{res}$ is quantized by the adaptive quantizer $Q_\phi$:

$$Q\phi_{res}=Q_\phi(\phi_{res},r_{2Drec})$$

A residual error azimuthal angle $IQ\phi_{res}$ is obtained from the adaptive inverse quantizer $IQ_\phi$:

$$IQ\phi_{res}=IQ_\phi(Q\phi_{res},r_{2Drec})$$

where, as above explained, the adaptive inverse quantizer $IQ_\phi(.)$ performs the operation $$IQ\phi_{res}=Q\phi_{res}*\Delta\phi(r_{2Drec})$$

In variant, the multiplication may be approximated by less complex operations bitwise shift operation and/or additions/subtractions.

In a variant, an internal representation $\Delta I\phi$ of an azimuthal angle $\phi$ is used to allow better precision than the smallest quantization step $\Delta\phi_{arc}$/max_r where max_r is a maximum radius of the points of the point cloud. This improves the efficiency of the adaptive quantization.

In practice, an internal precision $$\Delta I\phi = \frac{2*\pi}{2^N}$$

with N=18 is sufficient to obtain significant compression gains but this the value for N largely depends on the size (for example 20 bits) of the 3D space to which the point cloud belongs.

Let $\Delta$ be a quantization step of residual error cartesian coordinates ($x_{res}$, $y_{res}$) i.e. the expected accuracy in cartesian space for the reconstructed cartesian coordinates ($x_{dec}$, $y_{dec}$). Typically, $\Delta=1$ for lossless coding of integer coordinates, and is higher than 1 for lossy coding. To obtain high compression results, $\Delta\phi_{arc}$ is typically chosen so that its length in the cartesian space is $\Delta$.

In a GPCC encoder, as previously mentioned, internal precision of azimuthal angles is $$\Delta I\phi = \frac{2*\pi}{2^N},$$

the internal angle quantization step. Since $\phi_{res}$ is obtained as a difference between an azimuthal angle $\phi$ and a predicted azimuthal angle $\phi_{pred}$ with same internal precision, the residual error azimuthal angle $\phi_{res}$ also has the same internal precision $\Delta I\phi$. The internal (fixed point) representation $I\phi_{res}$ thus verifies:

$$\phi_{res}=I\phi_{res}*2*\pi/2^N$$

The quantized residual error azimuthal angle $Q\phi_{res}$ is then obtained by $$Q\phi_{res}=\text{round}(I\phi_{res}*r_{2Drec}*2*\pi/\Delta\phi_{arc}/2^N).$$

involving an additional multiplication by the constant $2*\pi$ to compensate for the $2*\pi$ factor in the internal quantization step $\Delta I\phi$ (and an additional bitwise shift to implement the division by $2^N$).

The internal (fixed point) representation of inverse quantized residual error azimuthal angle $IQI\phi_{res}$ is then obtained by $$IQI\phi_{res}=Q\phi_{res}*1(r_{2Drec}*2*\pi/\Delta\phi_{arc}/2^N)$$

In a variant, $2*\pi$ is represented with fixed-point precision value.

In alternative implementations, to use simpler operations/computations, $\Delta\phi_{arc}$ is chosen such that the fixed-point multiplication by $2*\pi/\Delta\phi_{arc}$ is replaced by a few bitwise shift operations and additions, and so $2*\pi/\Delta\phi_{arc}$ value has a few bits equal to one. For instance, with $2*\pi/\Delta\phi_{arc}$=4, 5, 6, 7 or 8; only 1, 2, 2, 3 or 1 bit(s) are used respectively, and so the multiplication can be implemented by 1, 2, 2, 3 or 1 bitwise shift operations, and the same number of additions. To be close to $\Delta\phi_{arc}=\Delta$, $2*\pi/\Delta\phi_{arc}=8$ is one of the best options (i.e. $\Delta\phi_{arc}=2*\pi/8$) to make a good compromise between the number of involved operations and the compression efficiency.

In a variant, adaptively quantizing may be signaled by a syntax element by adding, for example a flag, denoted for example uniform_phi_quantization_flag in a geometry parameter set.

If syntax element indicates a validate adaptive quantization then the adaptive quantization is performed for all the points that are coded with the prediction tree. Otherwise, the adaptive quantizing is not used. This would enable backward compatibility with G-PCC bitstream where the adaptive quantization is not enabled or disabled according to a dedicated syntax element.

Referring to FIG. 12, the reconstructed azimuthal angle $\phi_{rec}$ is obtained by adding the residual error azimuthal angle $IQ\phi_{res}$ and the predicted azimuthal angle $\phi_{pred}$.

$$(r_{2Drec},\phi_{rec},\theta)=(r_{2Dpred},\phi_{pred},\theta_{pred})+(r_{2Dres},IQ\phi_{res},\theta_{res})$$

Residual error azimuthal angle ($r_{2Dres}$, $Q\phi_{res}$, $\theta_{res}$) may be lossless encoded in the bitstream.

Figure 13:
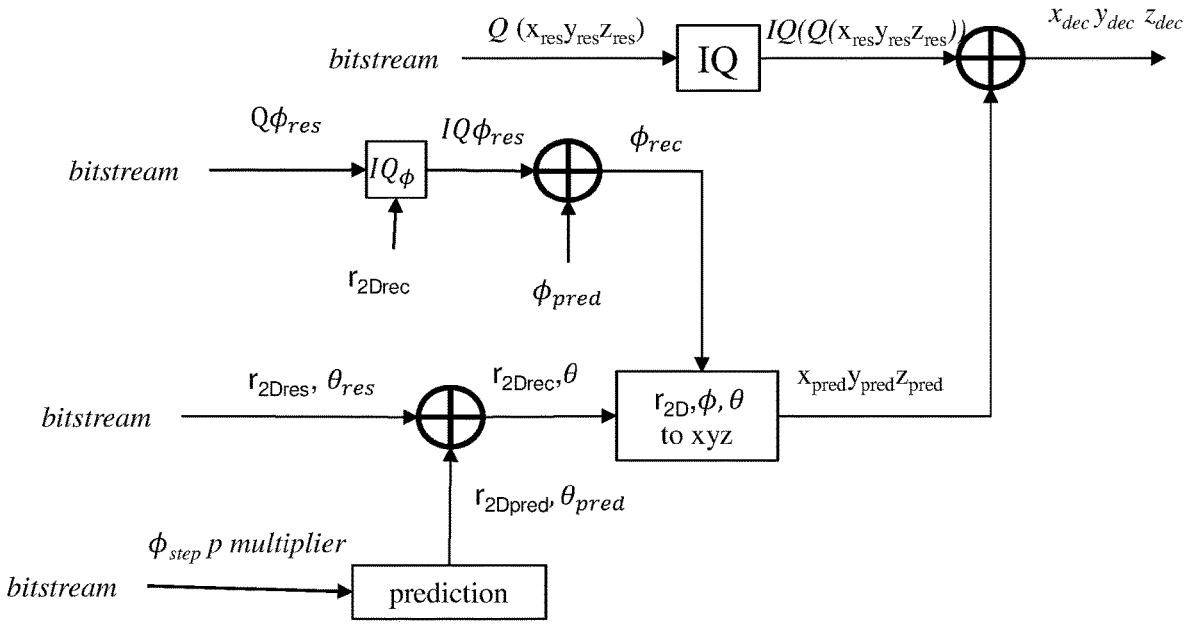
FIG. 13 illustrates adaptively de-quantizing of the azimuthal angle in a G-PCC decoder in accordance with at least one exemplary embodiment.

FIG. 13 illustrates adaptively de-quantizing of an azimuthal angle in a G-PCC decoder in accordance with at least one exemplary embodiment.

Compared to the G-PCC encoder described in relation with FIG. 6, reconstructed azimuthal angle ($r_{2Drec}$, $\phi_{rec}$, $\theta$) are obtained by adding residual error azimuthal angle ($r_{2Dres}$, $IQ\phi_{res}$, $\theta_{res}$), and predicted azimuthal angle ($r_{2Dpred}$, $\phi_{pred}$, $\theta_{pred}$):

$$(r_{2Drec},\phi_{rec},\theta)=(r_{2Dpred},\phi_{pred},\theta_{pred})+(r_{2Dres},IQ\phi_{res},\theta_{res})$$

where the residual error azimuthal angle $IQ\phi_{res}$ is obtained from the adaptive inverse quantizer $IQ_\phi$.

According to an exemplary embodiment, the radius $r_{2D}$ is adaptively quantized based on a predicted azimuthal angle $\phi_{pred}$ and the azimuthal angle $\phi$ is adaptively quantized based on the reconstructed radius $r_{2Drec}$.

Figure 14:
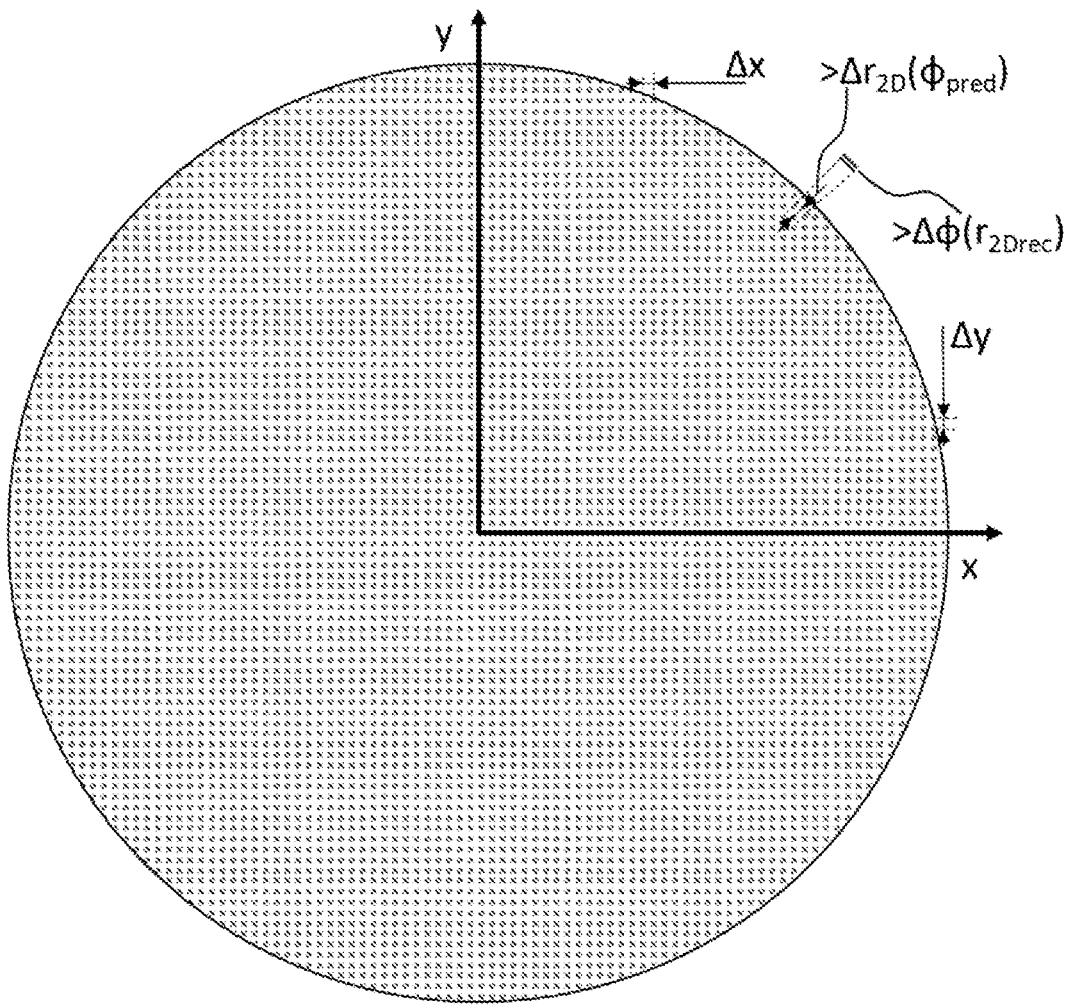
FIG. 14 illustrates adaptively quantizing the azimuthal angles and radius in accordance with an at least one exemplary embodiment.

As illustrated in FIG. 14, this exemplary embodiment provides uniform quantizing precision in the cartesian (x, y) plane by adequately choosing adaptive quantization steps $\Delta r_{2D}(\phi_{pred})$ and $\Delta\phi(r_{2Drec})$.

The choice of quantization steps $\Delta r_{2D}(\phi_{pred})$ and $\Delta\phi(r_{2Drec})$ must takes the inverse transformation from the spherical coordinates to the Cartesian coordinates such as to obtain the desired uniformity in the (x, y) plane.

Let $\Delta x$ and $\Delta y$ be a targeted quantization error in the cartesian (x, y) plane, errors obtained after quantization in the spherical space and inverse transformation to the cartesian space. One should seek for the biggest quantization steps $\Delta r_{2D}(\phi_{pred})$ and $\Delta\phi(r_{2Drec})$ that provide the targeted error $\Delta x$ and $\Delta y$. Maximizing the step sizes is essential in order to not code unnecessary spherical information for the targeted error.

As example, one may take $\Delta x=\Delta y=\Delta$ to obtain isotropic uniform error in the cartesian (x, y) plane. This is advantageous, in terms of compression, if the geometrical behavior of the point cloud is the same along the two x and y axis.

In yet another example, one may take $\Delta x=\Delta y=1$ to avoid any residual error spherical coordinates ($x_{res}$, $y_{res}$). This is advantageous as it would simplify the encoder by removing cartesian residual step. It is also advantageous in terms of compression for lossless coding according to practical tests. It has also been tested that, due to computational errors of fixed-point implementation, some tiny noise may remain on residual error cartesian coordinates ($x_{res}$, $y_{res}$) that may not be all equal to zero even if the large majority is. A simple run-length coder may capture this tiny noise while keeping the codec simple and ensure lossless coding with good compression efficiency.

Figure 15:
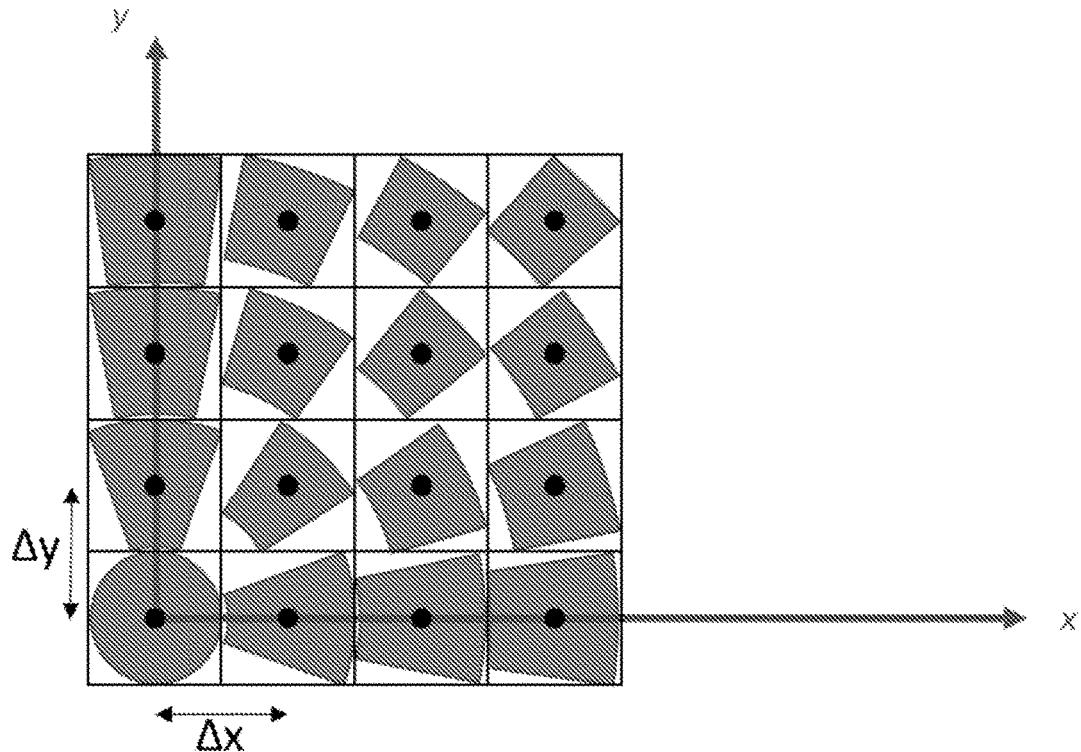
FIG. 15 illustrates an example of adaptive quantization of an azimuthal angle $\phi$ and a radius $r_{2D}$ with a uniform targeted error $\Delta x = \Delta y$ in the (x, y) plane in accordance with an at least one exemplary embodiment.

FIG. 15 illustrates an example of adaptive quantization of $\phi$ and a radius $r_{2D}$ with a uniform targeted error $\Delta x=\Delta y$ in the (x, y) plane.

In each (x, y) cartesian quantized square area, an adaptive quantization step $\Delta r_{2D}(\phi_{pred})$ (denoted $\Delta r$ in the following equations and on FIG. 16) and an adaptive quantization step $\Delta\phi(r_{2Drec})$ (denoted $\Delta\phi$ in the following equations and on FIG. 16) have been chosen such that the quantized angular sector obtained by the adaptive quantization steps $\Delta\phi$ and $\Delta r$ are contained inside of the cartesian quantized square.

The optimal (i.e. the biggest) quantization steps $\Delta\phi$ and $\Delta r$ that fulfil the condition on a uniform targeted error $\Delta x=\Delta y$ are $$\Delta r=\Delta/(|\sin(\phi)|+|\cos(\phi)|), \qquad (A)$$

$$\Delta\phi=\Delta r_{2D}(\phi)/r_{2Drec}. \qquad (B)$$

Figure 16:
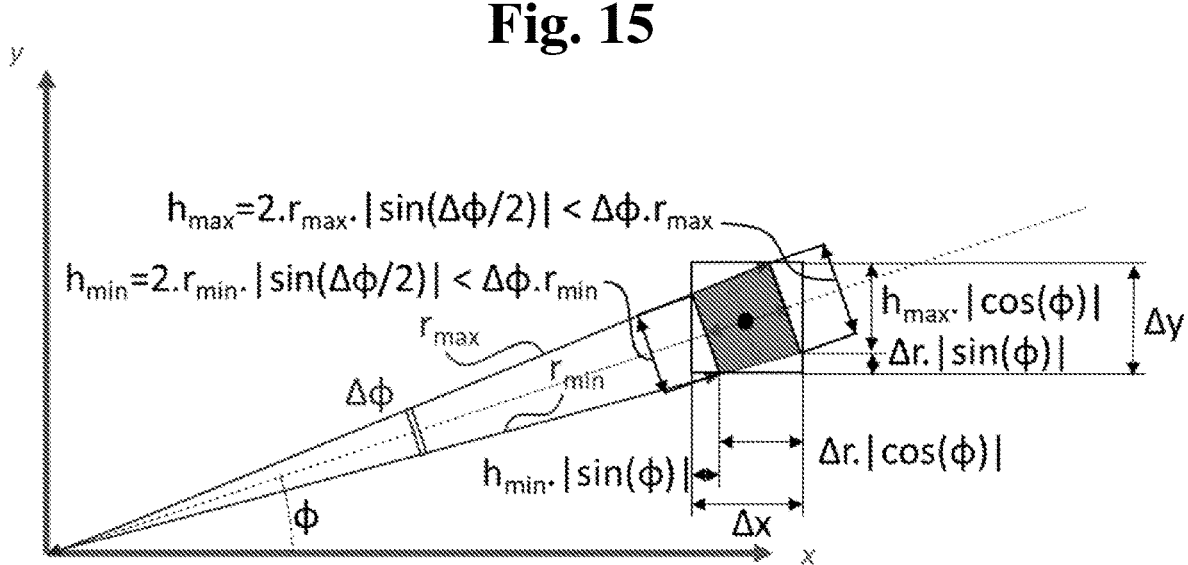
FIG. 16 illustrates the optimal formulae for adaptive quantization steps in accordance with at least one exemplary embodiment.

This can be proved starting from FIG. 16 where the black point represents the reconstructed position of any point that belongs to the surrounding angular sector. The angular sector itself is contained in a bounding box having width $\Delta x$ and height $\Delta y$.

To ensure that the quantization angular sector fits in the $\Delta x*\Delta y$ box, adaptive quantization steps $\Delta\phi$ and $\Delta r$ must be chosen such that $$h_{min}|\sin(\phi)|+\Delta r|\cos(\phi)|<=\Delta x$$

$$h_{max}|\cos(\phi)|+\Delta r|\sin(\phi)|\oplus<=\Delta y$$

where $h_{min}=2r_{min}|\sin(\Delta\phi/2)|$ and $h_{max}=2r_{max}|\sin(\Delta\phi/2)|$.

Since the segment length is shorter than the arc length, i.e. $h_{min}<\Delta\phi(r_{2Drec})*r_{min}$ and $h_{max}<\Delta\phi(r_{2Drec})*r_{max}$, this may be approximated and simplified into conditions $$\Delta\phi.r_{min}|\sin(\phi)|+\Delta r|\cos(\phi)|<=\Delta x,$$

$$\Delta\phi.r_{max}|\cos(\phi)|+\Delta r|\sin(\phi)|<=\Delta y.$$

As above discussed, it is advantageous to maximize the quantization step sizes, therefore inequalities are advantageously transformed into equalities to define the optimal quantization steps.

$$\Delta\phi.r_{min}|\sin(\phi)|+\Delta r|\cos(\phi)|<=\Delta x,$$

$$\Delta\phi.r_{max}|\cos(\phi)|+\Delta r|\sin(\phi)|<=\Delta y.$$

This system of equations is easily solved to obtain formulae for the quantization steps, namely $$\Delta r=(\Delta x\ r_{max}|\cos(\phi)|-\Delta y\ r_{min}|\sin(\phi)|)/(r_{max}|\cos(\phi)|^2-r_{min}|\sin(\phi)|^2)$$

$$\Delta\phi=(\Delta x-\Delta r|\cos(\phi)|)/(r_{min}|\sin(\phi)|)=(\Delta y|\cos(\phi)|-\Delta x|\sin(\phi)|)/(r_{max}|\cos(\phi)|^2-r_{min}|\sin(\phi)|^2)$$

As above discussed, it is advantageous to take $\Delta x=\Delta y=\Delta$ for anisotropic signal. Also, at first approximation, which is particularly true for small quantization steps, one may assume $r_{min}$ to be equal to $r_{max}$ $$r_{min}=r_{max}=r_{2Drec}+\Delta r/2.$$

Using these simplifications and approximations, one gets $$\Delta r=\Delta/(|\sin(\phi)|+|\cos(\phi)|)$$

$$\Delta\phi=\Delta/((|\sin(\phi)|+|\cos(\phi)|)r_{max})=\Delta/((|\sin(\phi)|+|\cos(\phi)|)*(r_{2Drec}+\Delta r/2))=\Delta r/(r_{2Drec}\Delta r/2)$$

Finally, approximating $r_{2Drec}+\Delta r/2$ by $r_{2Drec}$ leads to equations (A) and (B).

Figure 17:
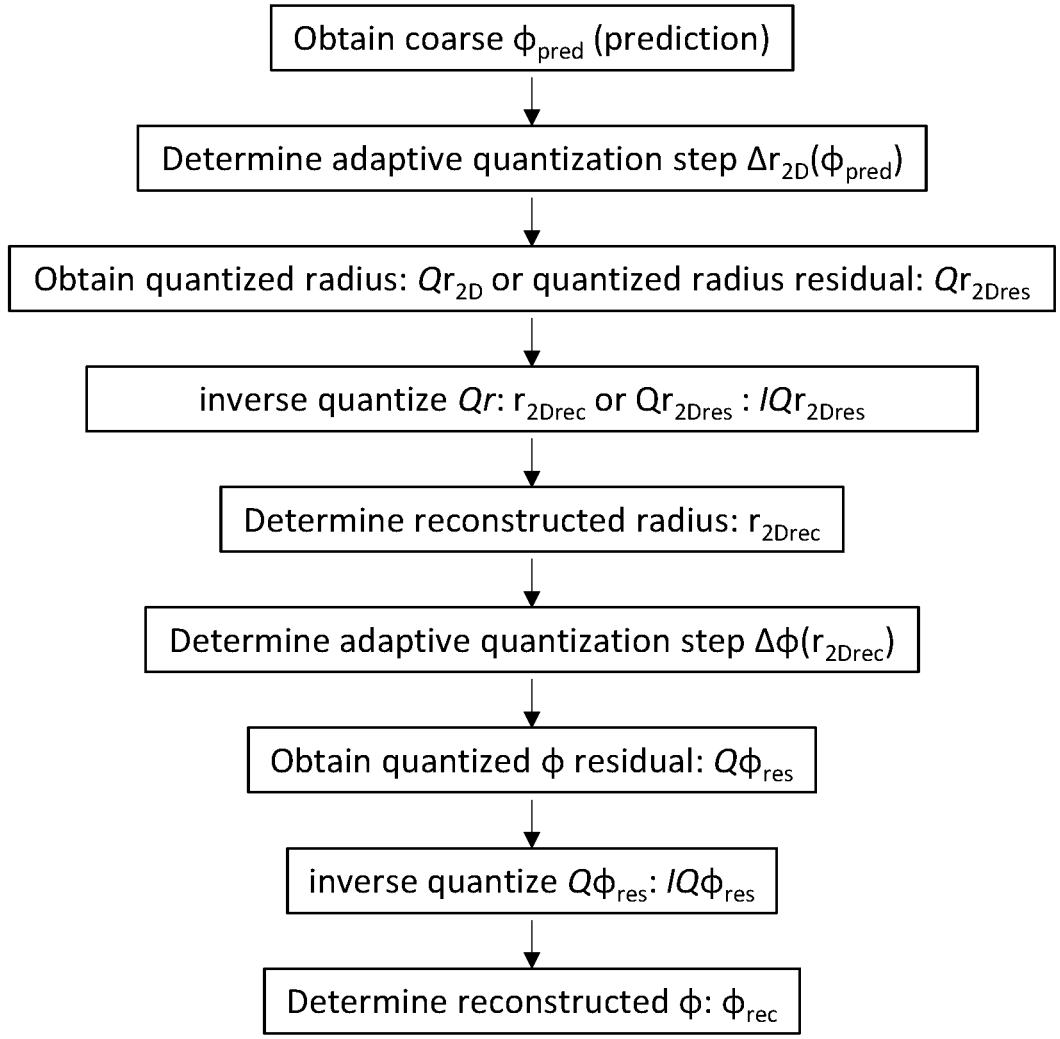
FIG. 17 illustrates a block diagram of steps of a method of adaptively quantizing a radius and an azimuthal angle in accordance with at least one exemplary embodiment.

FIG. 17 illustrates a block diagram of steps of a method of adaptively quantizing a radius $r_{2D}$ and an azimuthal angle $\phi$ in accordance with at least one exemplary embodiment.

Firstly, a predicted azimuthal angle $\phi_{pred}$ of the azimuthal angle q is obtained (from the decoding process for example) and this prediction is used to determine the adaptive quantization step $\Delta r_{2D}(\phi_{pred})$ of the radius $r_{2Drec}$:

$$\Delta r_{2D}(\phi_{pred})=\Delta/(|\sin(\phi_{pred})|+|\cos(\phi_{pred})|) \qquad (C)$$

Secondly, in case of prediction-based coding, a quantized residual error radius $Qr_{2Dres}$ is obtained. Otherwise, a quantized radius Qr is obtained. Inverse quantization is applied to the quantized residual error radius $Qr_{2Dres}$ (or Qr) to obtain a reconstructed residual error radius $IQr_{2Dres}$ (or the reconstructed radius $r_{2Drec}$). In case of prediction-based coding, the reconstructed radius $r_{2Drec}$ is given by $r_{2Drec}=IQr_{2Dres}+r_{2Dpred}$.

Next steps are similar to those described in FIG. 11. The reconstructed radius $r_{2Drec}$ is used to determine the adaptive quantization step $$\Delta\phi(r_{2Drec})=\Delta r_{2D}(\phi_{pred})/r_{2Drec} \qquad (D)$$

Then, a quantized residual error azimuthal angle $Q\phi_{res}$ is obtained (by either computation on the encoder side or by decoding on the decoder side), this quantized residual error azimuthal angle is inverse quantized using the adaptive quantization step $\Delta\phi(r_{2Drec})$ to obtain a reconstructed residual error azimuthal angle $IQ\phi_{res}$.

Finally, a reconstructed azimuthal angle $\phi_{rec}$ is obtained by adding the predicted azimuthal angle $\phi_{pred}$ and the reconstructed residual error azimuthal angle $IQ\phi_{res}$.

Some imprecision may be introduced in the determination of the two adaptive quantization steps $\Delta r_{2D}(\phi_{pred})$ and $\Delta\phi(r_{2Drec})$ such that the uniform targeted errors $\Delta x$ and $\Delta y$ may be missed. This is particularly annoying in case the errors $\Delta x$ and $\Delta y$ are designed to avoid a cartesian xy residual because there is no such residual to compensate for the miss anymore. A more careful design of the determination of the adaptive quantization $\Delta r_{2D}(\phi_{pred})$ and $\Delta\phi(r_{2Drec})$ can anticipate the effect of the imprecision and can practically ensure the respect of the targeted errors $\Delta x$ and $\Delta y$.

Figure 18:
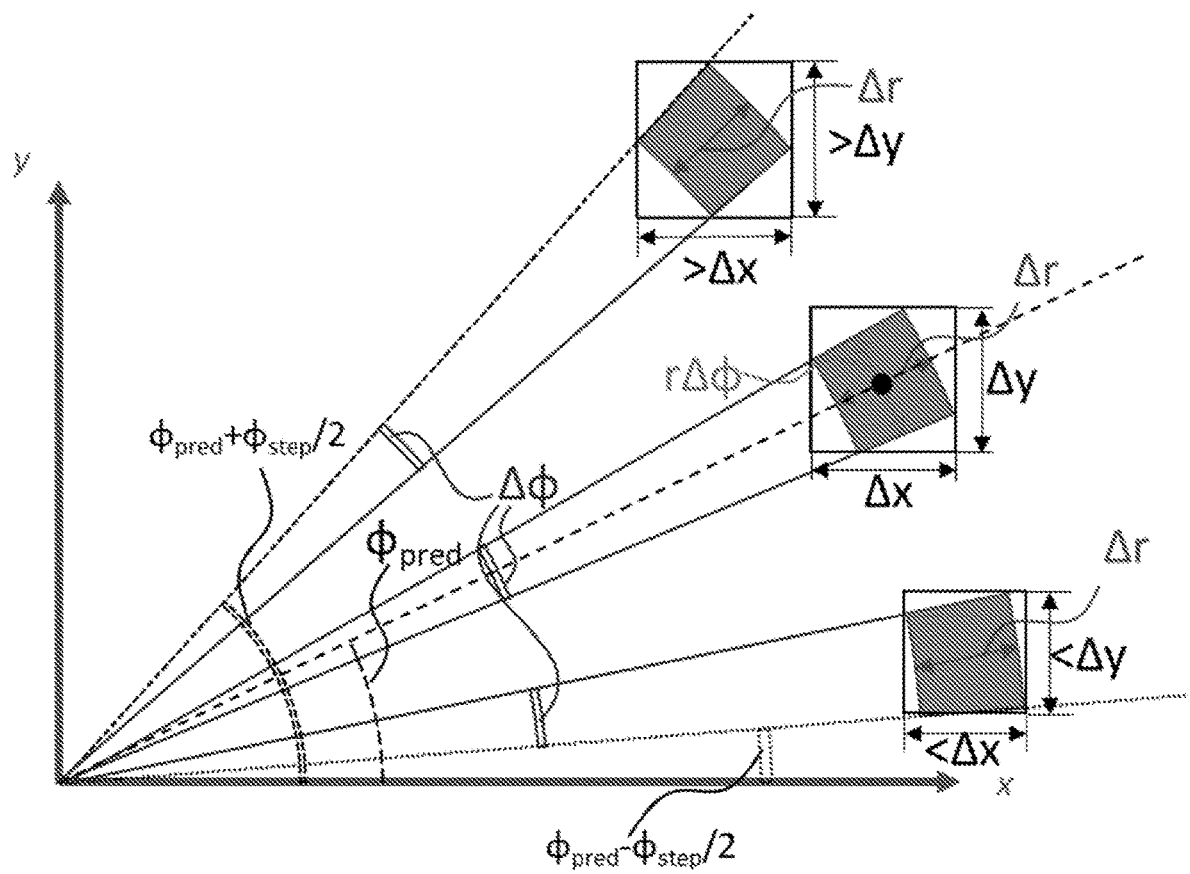
FIG. 18 illustrates effect of imprecision on a predicted azimuthal angle in accordance with at least one exemplary embodiment.

Imprecision may be due to quantization of the predicted azimuthal angle $\phi_{pred}$ by the elementary step $\phi_{step}$. This leads to a bounded imprecision, up to $\phi_{step}/2$, on $\phi_{pred}$. Referring to FIG. 18 this imprecision propagates to $\Delta r$ ($=\Delta r_{2D}(\phi_{pred})$) and $\Delta\phi(=\Delta\phi(r_{2Drec}))$ through sine and cosine functions. Another reason is computational precision on trigonometric function. This imprecision introduces an error bounded by $\Delta\varepsilon$ for cosine and for sine. This imprecision may be due to fixed-point calculation or approximation of sine and cosine functions, etc. Another reason is other computational imprecision $\Delta i$, notably on the division by the radius in the formulae on $\Delta\phi(=\Delta\phi(r_{2Drec})$.

All these imprecisions may combine together.

Let us consider the function $$\phi->|\sin(\phi)|+|\cos(\phi)|.$$

Its maximum derivative value is sqrt(2). At first approximation, the error due to the quantization of the predicted angle $\phi_{pred}$ is sqrt(2) $\phi_{step}/2$. Also, the cumulative error on sine and cosine is $2\Delta\varepsilon$. Consequently, the error on the function is bounded by $$\Delta\varepsilon'=2\Delta\varepsilon+sqrt(2)\ \phi_{step}/2.$$

Let $E\geq0$ be the maximum magnitude of the error $\Delta\varepsilon'$. In order to preserve the targeted error $\Delta x=\Delta y$ in the (x, y) plane, one must take some margin on the approximation of the function sine plus cosine by changing the quantization step formula into $$\Delta r=\Delta/(|\sin(\phi_{pred})|+|\cos(\phi_{pred})|+E) \qquad (E)$$

Because E is difficult to estimate, one may choose to use a function f such that $$f(\phi_{pred}) \geq |\sin(\phi_{pred})| + |\cos(\phi_{pred})| + E$$

and change the quantization step formulae into $$\Delta r_{2D} = \Delta/f(\phi_{pred}) \qquad (F)$$

$$\Delta\phi = \Delta r_{2D}(\phi_{pred})/r_{2Drec} \qquad (G)$$

In a variant, one may choose f to be a function of the quantity $|\sin(\phi)| + |\cos(\phi)|$ $$f(\phi) = g(|\sin(\phi)| + |\cos(\phi)|)$$

where g is a function.

In another variant, one may choose $$f(\phi) = |\sin(\phi)| + |\cos(\phi)51 + \beta$$

where $\beta$ is a positive parameter $\beta \geq 1$.

In yet another variant, one may choose $$f(\phi) = 1 + \alpha(|\sin(\phi)| + |\cos(\phi)| - 1)$$

for a positive parameter $\alpha \geq 1$. On the other hand, when a cartesian residual is used, one may not want to code the radius $r_{2D}$ and the azimuthal angle $\phi$ with a precision that would be lost due to the further computation errors $\Delta i$ and one want to have $\alpha \leq 1$ such that $$f(\phi_{pred}) + \Delta i \geq |\sin(\phi_{pred})| + |\cos(\phi_{pred})|.$$

In practice, tests show that $\alpha = 0.85$. provides excellent results.

Figure 19:
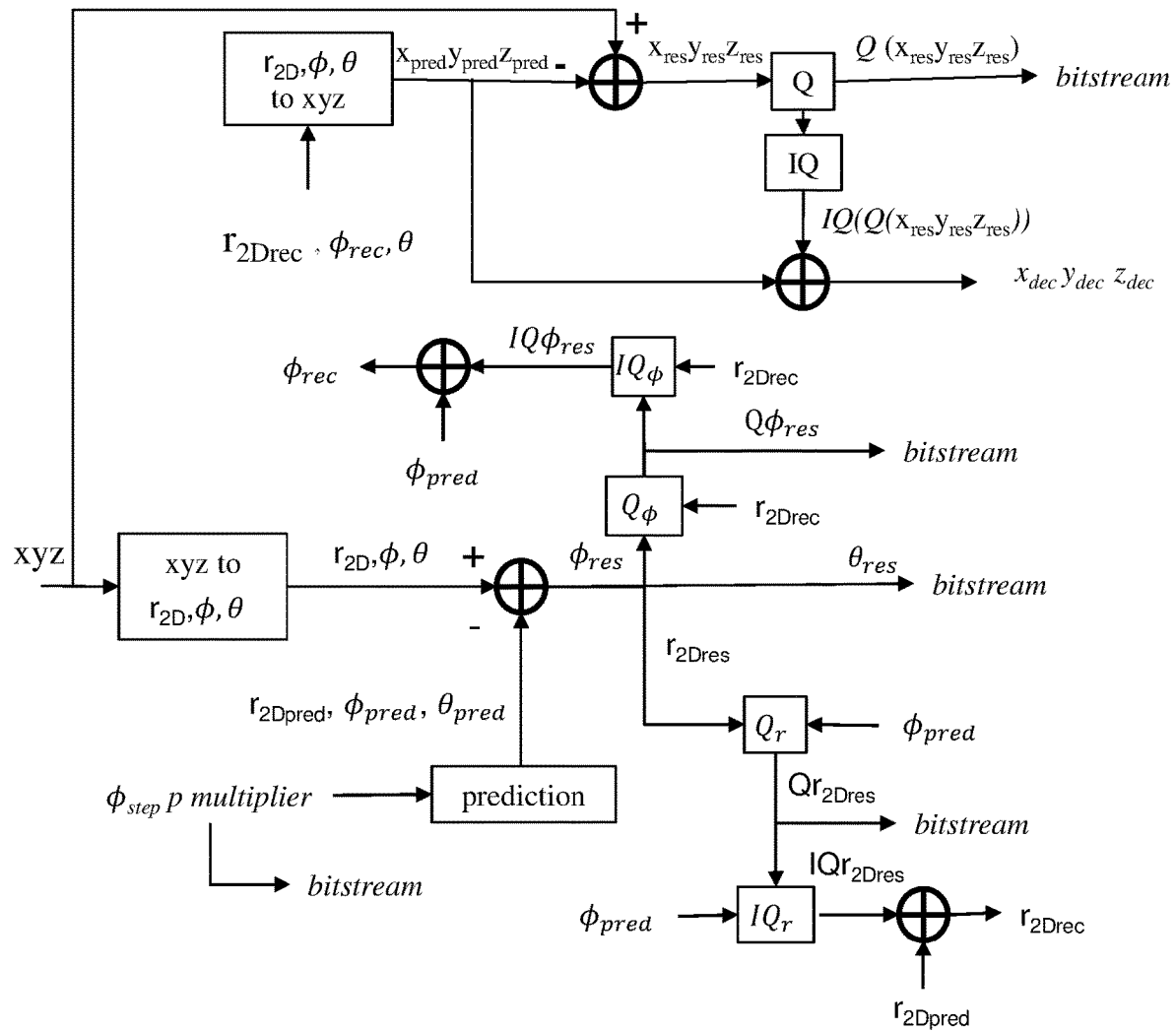
FIG. 19 illustrates a G-PCC predictive tree encoder in accordance with at least one exemplary embodiment.

FIG. 19 illustrates a G-PCC predictive tree encoder in accordance with at least one exemplary embodiment.

Compared to the G-PCC encoder described in relation with FIG. 12, the adaptive quantizer $Q_\phi$, performs operations according to one of the equations (B), (D) or (G). An adaptive inverse quantizer $IQ_\phi$, performs the inverse operations.

The residual error radius $r_{2Dres}$ is quantized by an adaptive quantizer $Q_r$ that uses a predicted azimuthal angle $\phi_{pred}$:

$$Qr_{2Dres} = Q_r(r_{2Dres}, \phi_{pred})$$

where the adaptive quantizer $Q_r$ performs operation according to equation (A), (C), (E) or (F). An inverse adaptive quantizer $IQ_r$ performs the inverse operations.

Reconstructed radius $r_{2Drec}$ is obtained by inverse quantizing the quantized residual error radius $Qr_{2Dres}$ thanks to the adaptive inverse quantizer $IQ_r$ and by adding the inverse quantized residual error radius $IQr_{2Dres}$ to the predicted radius $r_{2Dpred}$.

The reconstructed radius $r_{2Drec}$ is used as adaptive quantization parameter of the adaptive quantizer $Q_\phi$, and adaptive inverse quantizer $IQ_\phi$.

According to an exemplary embodiment where the quantization is carefully chosen for lossless coding, the residual error cartesian coordinates $Q(x_{res}, y_{res}, z_{res})$ are systematically zero and do not need to be coded.

Figure 20:
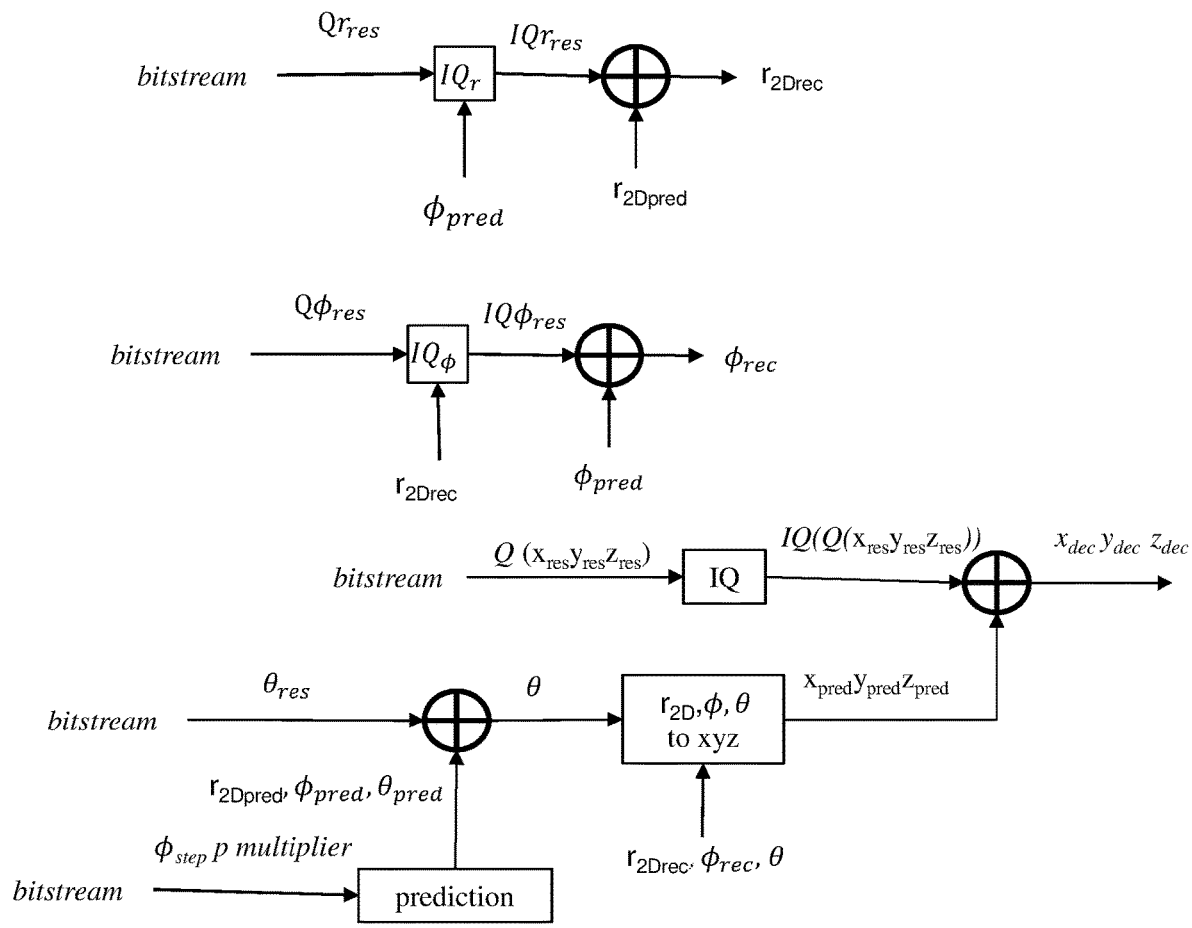
FIG. 20 illustrates a G-PCC predictive tree decoder in accordance with at least one exemplary embodiment.

FIG. 20 illustrates a G-PCC predictive tree decoder in accordance with at least one exemplary embodiment.

Compared to the G-PCC decoder described in relation with FIG. 13, reconstructed spherical coordinates $(r_{2Drec}, \phi_{rec}, \theta)$ are obtained by adding residual error spherical coordinates $(IQr_{res}, IQ\phi_{res}, \theta_{res})$, and predicted spherical coordinates $(r_{2Dpred}, \phi_{pred}, \theta_{pred})$:

$$(r_{2Drec}, \phi_{rec}, \theta) = (r_{2Dpred}, \phi_{pred}, \theta_{pred}) + (IQr_{res}, IQ\phi_{res}, \theta_{res})$$

where the residual error spherical coordinate $IQr_{res}$ is given by the inverse quantizer $IQ_r$.

Denoting $\phi'$ an angle which verifies $|\sin(\phi)| + |\cos(\phi)| <= |\sin(\phi')| + |\cos(\phi')|$ for any $\phi$ in the range $[\phi_{pred} - \phi_{step}/2; \phi_{pred} + \phi_{step}/2]$, and $Q_{scale} = (|\sin(\phi')| + |\cos(\phi')| + 2.\Delta\epsilon')$, the adaptive quantizer $Q_r$ may perform $$Qr_{2Dres} = \text{round}(r_{2Dres} * Q_{scale})$$

using fixed-point precision arithmetic, where sin and cos are respectively sine and cosine fixed point precision approximation functions and with the round operation rounding to nearest integer. The inverse quantizer $IQ_r$ may perform $$r_{2Drec} = Qr_{2Dres}/Q_{scale}$$

using fixed-point precision arithmetic, so that the reconstructed radius $r_{2Drec}$ is obtained with the internal precision $\Delta Ir_{2D}$.

The quantizer $Q_\phi$ may perform $$Q\phi_{res} = \text{round}(\phi_{res} * (r_{2Drec} * Q_{scale} + \frac{1}{2}))$$

using fixed-point precision arithmetic, and with round( ) operation rounding the fixed-point representation to nearest integer.

The inverse quantizer $IQ_\phi$ may perform $$IQ\phi_{res} = Q\phi_{res}/((r_{2Drec} * Q_{scale} + \frac{1}{2}))$$

using fixed-point precision arithmetic, so that $IQ\phi_{res}$ is obtained with the internal precision $\Delta I\phi$.

This implementation is equivalent to using $$\Delta r = \Delta/(|\sin(\phi')| + |\cos(\phi')| + 2.\Delta\epsilon'), \text{ and}$$

$$\Delta\phi = \Delta/((|\sin(\phi')| + |\cos(\phi')| + 2.\Delta\epsilon') * r_{2Drec} + \Delta/2),$$

with $\Delta = 1$.

As a tradeoff between computation complexity and coding efficiency, in some alternative embodiments, further simplification for the computation of the quantization step could be performed as previously explained.

Figure 21:
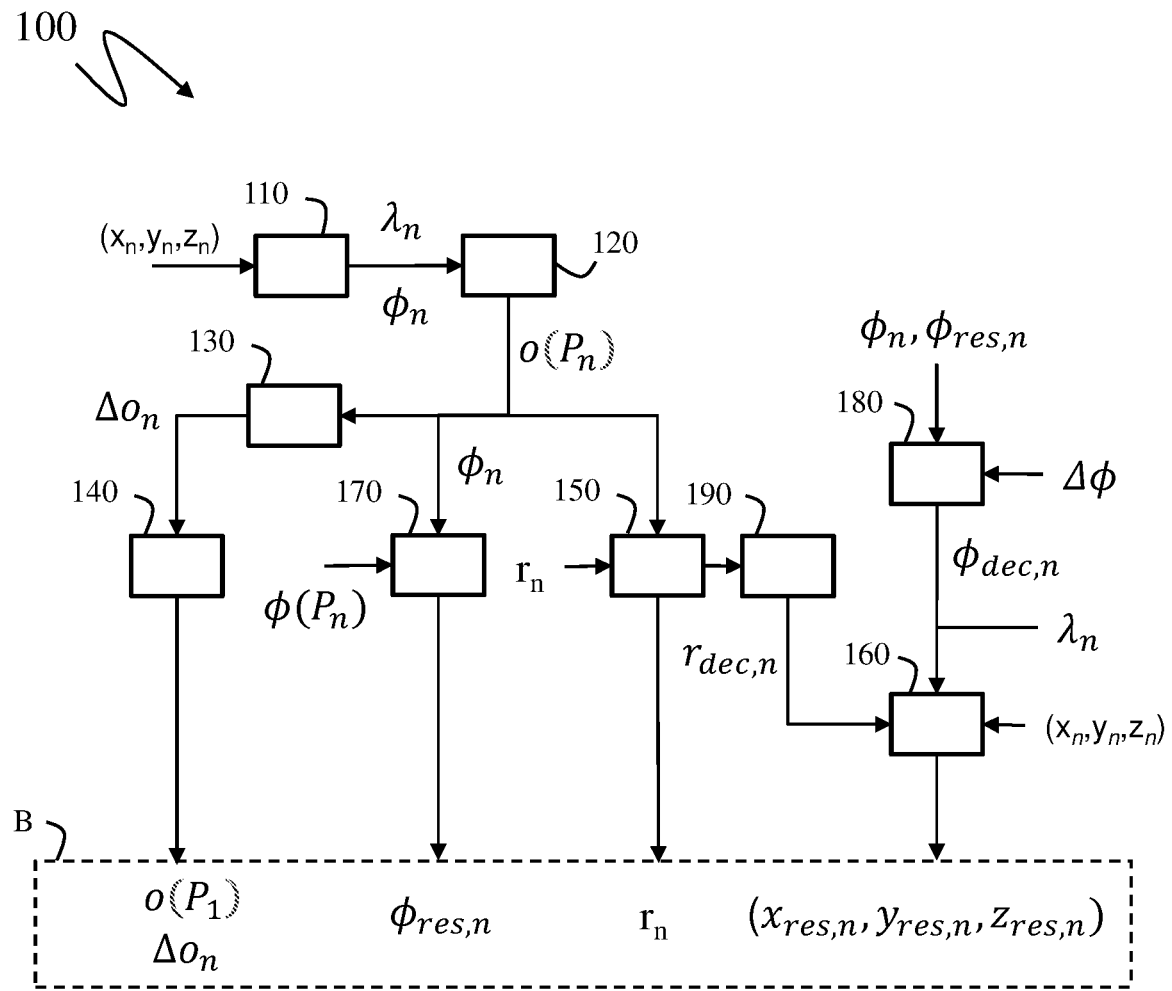
FIG. 21 illustrates a block diagram of steps of a method 100 of encoding a point cloud into a bitstream of encoded point cloud data representing a physical object in accordance with at least one exemplary embodiment.

FIG. 21 illustrates a block diagram of steps of a method 100 of encoding a point cloud into a bitstream of encoded point cloud data representing a physical object in accordance with at least one exemplary embodiment.

Geometry data of the point cloud, i.e. the 3D locations of points of the point cloud, is captured by a spinning sensor head.

The spinning sensors head may be the spinning Lidar head 10 including multiple lasers (sensors) as explained above. But the scope of the disclosure is not limited to a spinning Lidar head and may apply to any sensors head able to spin around an axis and to capture 3D locations points representing a physical object for each capture angular angle. Sensors may be cameras, depth sensors, lasers, Lidars or scanners.

Figure 22:
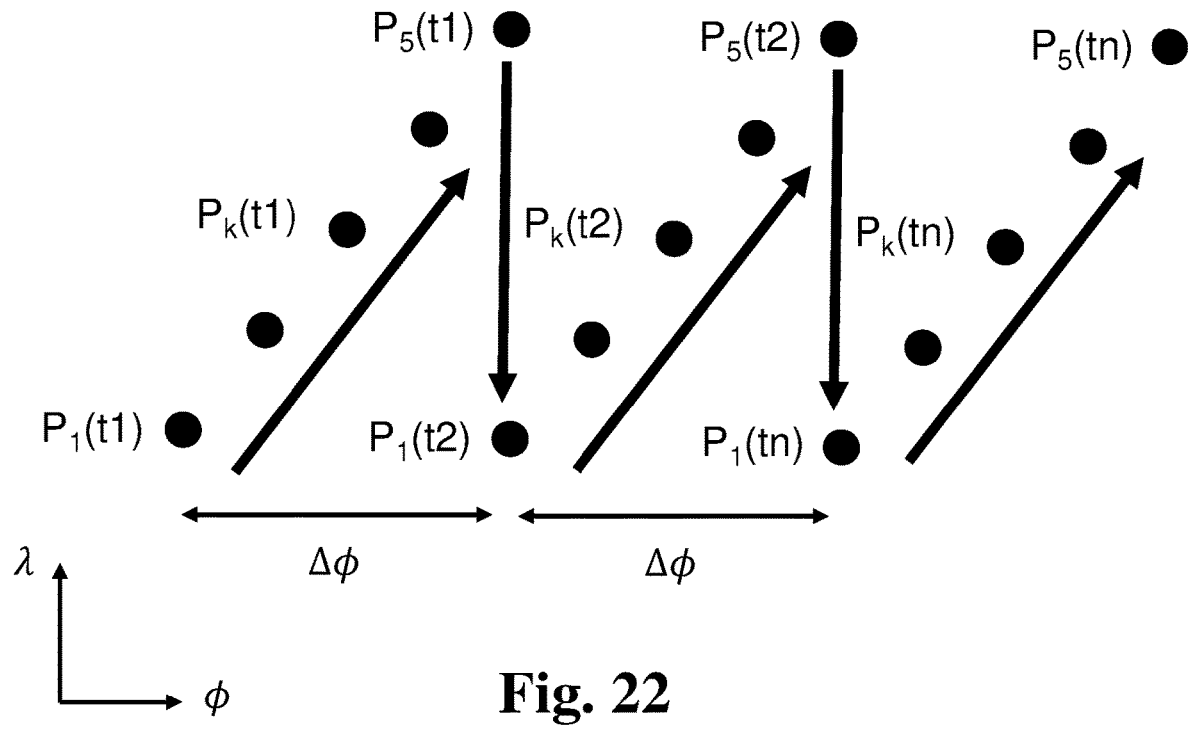
FIG. 22 illustrates an example of captured point represented in a 2D space in accordance with one exemplary embodiment of the present application.

The captured 3D locations are represented in a 2D coordinates $(\phi, \lambda)$ system, as depicted on FIG. 22, together with radius values $r_{2D}$ or $r_{3D}$. The coordinate $\phi$ is the azimuthal angle of the sensor head's spin whose discrete values are denoted $\phi_i$ ($\forall i=0$ to $I-1$). The coordinate $\lambda$ is a sensor index whose discrete values are denoted $\lambda_k$ ($\forall k=0$ to $K-1$). The radius $r_{2D}$ or $r_{3D}$ belongs to a continuous range of values.

Due to the regular spin (rotation) of the sensors head and the continuous capture with fixed time interval, the azimuthal distance between two points probed by a same sensor is a multiple of an elementary azimuthal shift $\Delta\phi$ as depicted on FIG. 22. Then, for example, at a first captured time t1, five points $P_1(t1), \ldots, P_k(t1), \ldots P_5(t1)$ are probed by the five sensors of the Lidar head 10 of FIG. 1 with an azimuthal angle $\phi_1$, at a second capture time t2, five points $P_1(t2), \ldots, P_k(t2), \ldots P_5(t2)$ are probed by the sensors of the Lidar head 10 with an azimuth angle $\phi_2=\phi_1+\Delta\phi$, and so on. Consequently, the discrete value $\phi_1$ may be seen as the quantized value of the azimuthal angles $\phi$ of the points $P_1(t1), \ldots, P_k(t1), \ldots P_5(t1)$; quantization being obtained by a quantization step $\Delta\phi$. Similarly, the discrete value $\phi_2$ may be seen as the quantized value of the azimuthal angles $\phi$ of the points $P_1(t2), \ldots, P_k(t2), \ldots P_5(t2)$.

In step 110, for each point $P_n$ of the point cloud, a sensor index $\lambda_{k(n)}$ (among the set of sensor indices $\lambda_k$ ($\forall k=0$ to K−1)) associated with a sensor that captured the point $P_n$, an azimuthal angle $\phi_{i(n)}$ (among the set of discrete angles $\phi_i$ ($\forall i=0$ to I−1)) representing a capture angle of said sensor and a radius value $r_n$ of spherical coordinates of the point $P_n$ are obtained. For sake of simplicity, $\lambda_{k(n)}$ and the index $i(n)$ will be respectively denoted $\lambda_n$ and $\phi_n$ hereafter. Consequently, $\phi_n$ is not an angle but an index $i$ ($\forall i=0$ to I−1)) pointing to an angle $\phi_i$. Nevertheless, because there is an unambiguous relation between the index $\phi_n$ and the canonically associated azimuthal angle $\phi_{i(n)}=\phi_{\phi n}$, the quantity $\phi_n$ is still referred as an azimuthal angle.

According to an exemplary embodiment of step 110, the sensor index $\lambda_n$ and the azimuthal angle $\phi_n$ are obtained by converting 3D cartesian coordinates $(x_n, y_n, z_n)$ representing the 3D location of a captured point $P_n$. These 3D cartesian coordinates $(x_n, y_n, z_n)$ may be output of the sensors head.

In step 120, points of the point cloud are ordered based on the azimuthal angles $\phi_n$ and the sensor indices $\lambda_n$.

According to an exemplary embodiment of step 120, the points are ordered according to a lexicographic order based first on the azimuthal angle and then on the sensor index. Referring back to FIG. 22, the ordered captured points are $P_1(t1), \ldots, P_k(t1), \ldots P_5(t1), P_1(t2), \ldots, P_k(t2), \ldots P_5(t2), \ldots, P_1(tn), \ldots, P_k(tn), \ldots P_5(tn)$.

The order index $o(P_n)$ of a point $P_n$ is obtained by:

$$o(P_n)=\phi_n*K+\lambda_n$$

According to an exemplary embodiment of step 120, the points are ordered according to a lexicographic order based first on the sensor index and then on the azimuthal angle. The order index $o(P_n)$ of a point $P_n$ is obtained by:

$$o(P_n)=\lambda_n*I-\phi_n$$

In step 130, order index differences $\Delta o_n$ representing, each, a difference between order indices of two consecutive points $P_{n-1}$ and $P_n$ (for n=2 to N), are obtained by:

$$\Delta o_n = o(P_n)-o(P_{n-1})$$

Encoding ordered points into a bitstream B may include encoding at least one order index difference $\Delta o_n$. Optionally, it may also include encoding radius values $r_n$ (essentially representative of either $r_{2D}$ or $r_{3D}$ of the point $P_n$, cartesian residuals $(x_{res,n}, y_{res,n}, z_{res,n})$ of three-dimensional cartesian coordinates of ordered points and angular residual $\phi_{res,n}$.

The order index $o(P_1)$ of the first point $P_1$ may be directly coded into the bitstream B. This is equivalent to arbitrary setting the order index of a virtual zero-th point to zero, i.e. $o(P_0)=0$, and coding $\Delta o_1=o(P_1)-o(P_0)=o(P_1)$.

Given the order index $o(P_1)$ of the first point and the order differences $\Delta o_n$, one can recursively reconstruct the order index $o(P_n)$ of any point $P_n$ by:

$$o(P_n)=o(P_{n-1})+\Delta o_n$$

Then, sensor indices $\lambda_n$ and azimuthal angle $\phi_n$ are obtained by:

$$\lambda_n=o(P_n) \text{ modulo } K \quad (1)$$

$$\phi_n=o(P_n)/K \quad (2)$$

where the division/K is the integer division (aka Euclidian division). Therefore, $o(P_1)$ and $\Delta o_n$ are an alternative representation of $\lambda_n$ and $\phi_n$.

Figure 23:
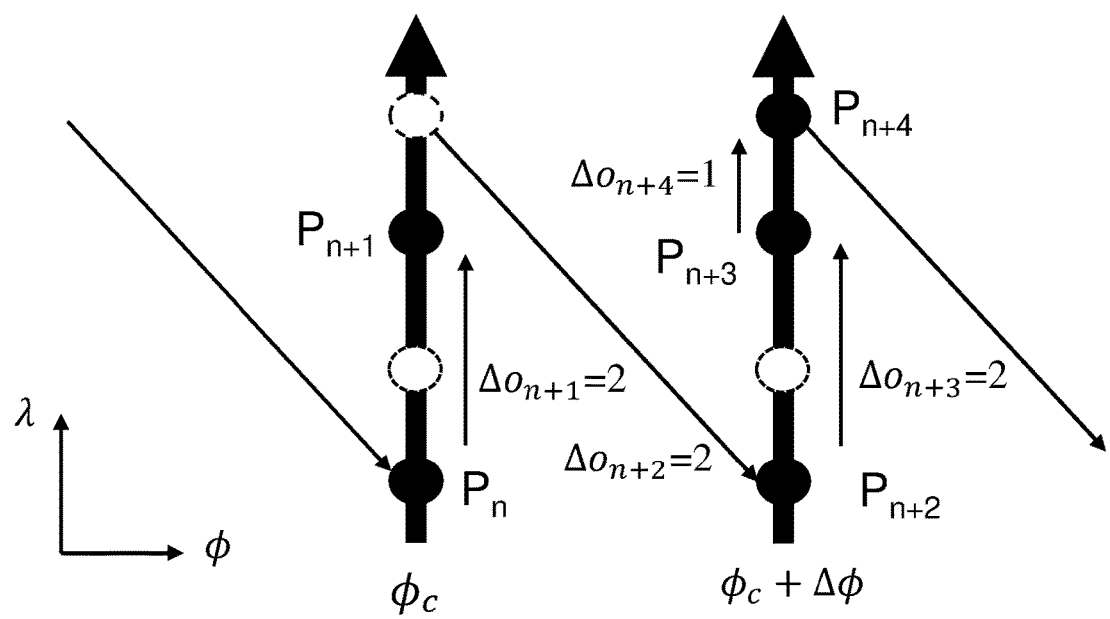
FIG. 23 illustrates an example of encoded ordered points in accordance with one exemplary embodiment of the present application.

In step 140, the order index $o(P_n)$ associated with ordered points are encoded, in the bitstream B, by encoding (N−1) order index differences $\Delta o_n$ ($\forall n=2$ to N) where N is the number of ordered points. Each order index $o(P_n)$ represents a difference between order indices associated with two consecutive ordered points. On FIG. 23, five ordered points are represented (black circles): two points $P_n$ and $P_{n+1}$ were captured in time t1 with an angular angle $\phi_c$ (among the $\phi_i$'s) and three points were captured in time t2 with an angular angle $\phi_c+\Delta\phi$. Assuming the coordinates of the first point $P_n$ in the 2D coordinates $(\phi, \lambda)$ system are known beforehand, a first order index difference $\Delta o_{n+1}$ is obtained as a difference between the order index $o(P_{n+1})$ associated with the point $P_{n+1}$ and the order index $o(P_n)$ associated with the point $P_n$. A second order index difference $\Delta o_{n+2}$ is obtained as a difference between the order index $o(P_{n+2})$ associated with another ordered point $P_{n+2}$ and the order index $o(P_{n+1})$ associated with $P_{n+1}$, and so on.

Ordering the captured points provides interaction between points captured by different sensors of the spinning sensors head. A single encoding is thus required for encoding those ordered points leading to a very simple and low latency encoding.

Reconstructing points from the order index differences $\Delta o_n$ requires information such as a number N of points of the point cloud, an order index $o(P_1)$ of a first point in the 2D coordinates $(\phi, \lambda)$ system, and sensor setup parameters such as the elementary azimuthal shift $\Delta\phi$ or an elevation angle e n associated with each sensor. This information may also be encoded in the bitstream B or signaled by another mean or may be known beforehand by a decoder.

According to an exemplary embodiment of step 140, the order index differences $\Delta o_n$ are entropy-encoded.

Optionally, the method further includes in step 150, encoding, in the bitstream B, the radius values $r_n$ of spherical coordinates associated with ordered points of the point cloud.

According to an exemplary embodiment of step 150, the radius values $r_n$ are quantized.

According to an exemplary embodiment of step 150, the radius values $r_n$ are quantized.

According to an exemplary embodiment of step 150, the radius values $r_n$ are quantized and entropy coded.

According to an exemplary embodiment of step 150, the radius values $r_n$ represents the radius $r_{3D}$.

Figure 4:
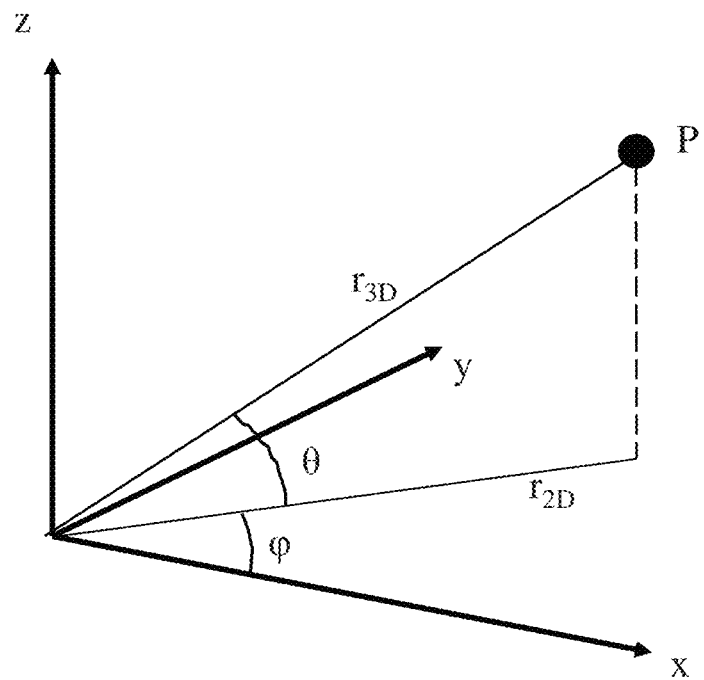
FIG. 4 illustrates a representation of a point in a 3D space in accordance with prior art.

According to an exemplary embodiment of step 150, the radius values $r_n$ represents the projected radius $r_{2D}$ on the horizontal xy plane as depicted on FIG. 4.

Optionally, the method further includes, in step 160, encoding the residuals $(x_{res,n}, y_{res,n}, z_{res,n})$ of three-dimensional cartesian coordinates of ordered points $P_n$ based on their three-dimensional cartesian coordinates $(x_n, y_n, z_n)$, on decoded azimuthal angles $\phi_{dec,n}$, on decoded radius values $r_{dec,n}$ obtained from radius values $r_n$, and on sensor indices $\lambda_n$.

According to an exemplary embodiment of step 160, the residuals $(x_{res,n}, y_{res,n}, z_{res,n})$ are differences between the three-dimensional cartesian coordinates $(x_n, y_n, z_n)$ of the points of the point cloud and estimated three-dimensional coordinates $(x_{estim,n}, y_{estim,n}, z_{estim,n})$ According to an exemplary embodiment of step 160, the residuals $(x_{res,n}, y_{res,n}, z_{res,n})$ are given by:

$$\begin{cases} x_{res,n} = x_n - x_{estim,n} \\ y_{res,n} = y_n - y_{estim,n} \\ z_{res,n} = z_n - z_{estim,n} \end{cases}$$

According to an exemplary embodiment of step 160, the estimated coordinates ($x_{estim,n}$, $y_{estim,n}$) associated with an ordered point $P_n$ are based on decoded azimuthal angles $\phi_{dec,n}$ and decoded radius values $r_{dec,n}$ associated with the point $P_n$.

According to an exemplary embodiment of step 160, the residuals ($x_{res,n}$, $y_{res,n}$, $z_{res,n}$) are entropy coded.

According to an exemplary embodiment of step 160, the estimated coordinates ($x_{estim,n}$, $y_{estim,n}$) are given by:

$$\begin{cases} x_{estim,n} = r_{dec,n} * \cos(\phi_{dec,n}) \\ y_{estim,n} = r_{dec,n} * \sin(\phi_{dec,n}) \end{cases}$$

According to an exemplary embodiment of a step 160, the estimated coordinate ($z_{estim,n}$) associated with an ordered point is based on a decoded radius value $r_{dec,n}$ associated with the point and an elevation angle $\theta_n$ of a sensor that captured the point.

According to an exemplary embodiment of step 160, the estimated coordinates ($z_{estim,n}$) are also based on the sensor indices $\lambda_n$.

According to an exemplary embodiment of step 160, the estimated coordinates ($z_{estim,n}$) are given by:

$$z_{estim,n} = r_{dec,n} \tan \theta_n$$

Optionally, the method further includes, in step 170, encoding, in the bitstream B, residual azimuthal angles $\phi_{res,n}$ associated with ordered points. According to an exemplary embodiment of a step 170, the azimuthal angles $\phi_n$ are quantized by:

$$\phi_n = \text{round}(\phi(P_n)/\Delta\phi)$$

where $\phi(P_n)$ is the original azimuthal angle of point $P_n$. In this case, the set of discrete angles $\phi_i$ (0≤i<I) is essentially defined by $\phi_i = i*\Delta\phi$ and one obtains $\phi_{i(n)} = \phi_n * \Delta\phi$.

The order index $o(P_n)$ of a point $P_n$ is thus given by:

$$o(P_n) = \phi_n * K + \lambda_n = \text{round}(\phi(P_n)/\Delta\phi) * K + \lambda_n.$$

The residual azimuthal angles $\phi_{res,n}$ is given by:

$$\phi_{res,n} = \phi(P_n) * \phi_n * \Delta\phi \quad (3)$$

Figure 24:
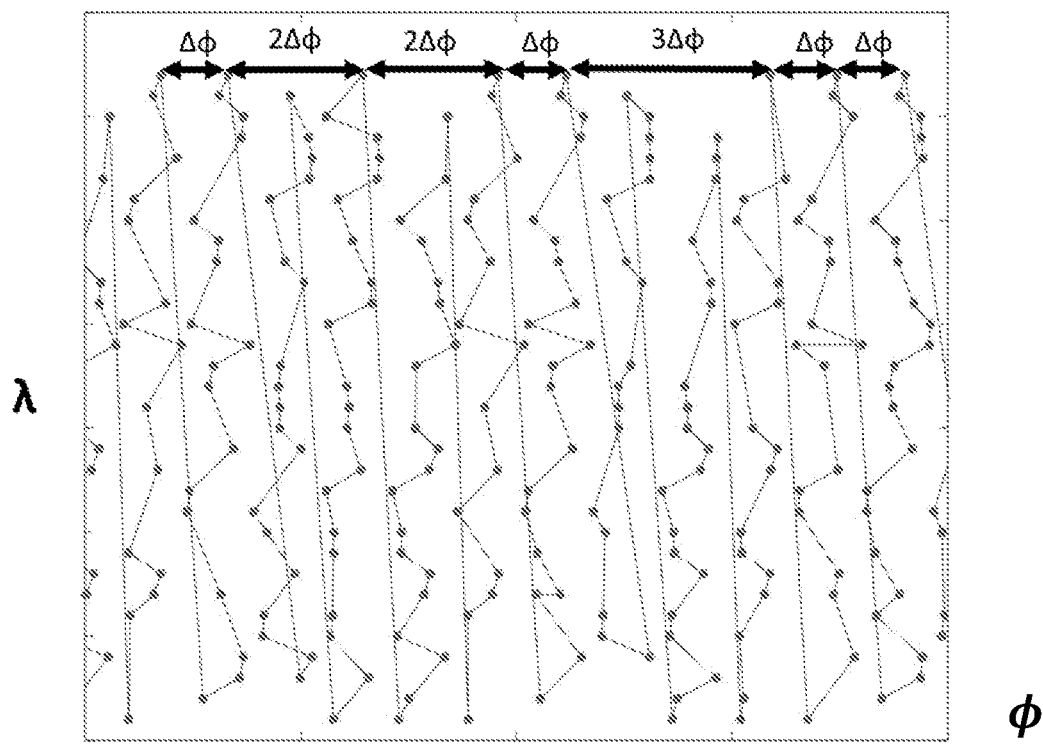
FIG. 24 illustrates an example of captured points in accordance with one exemplary embodiment of the present application.
Figure 25:
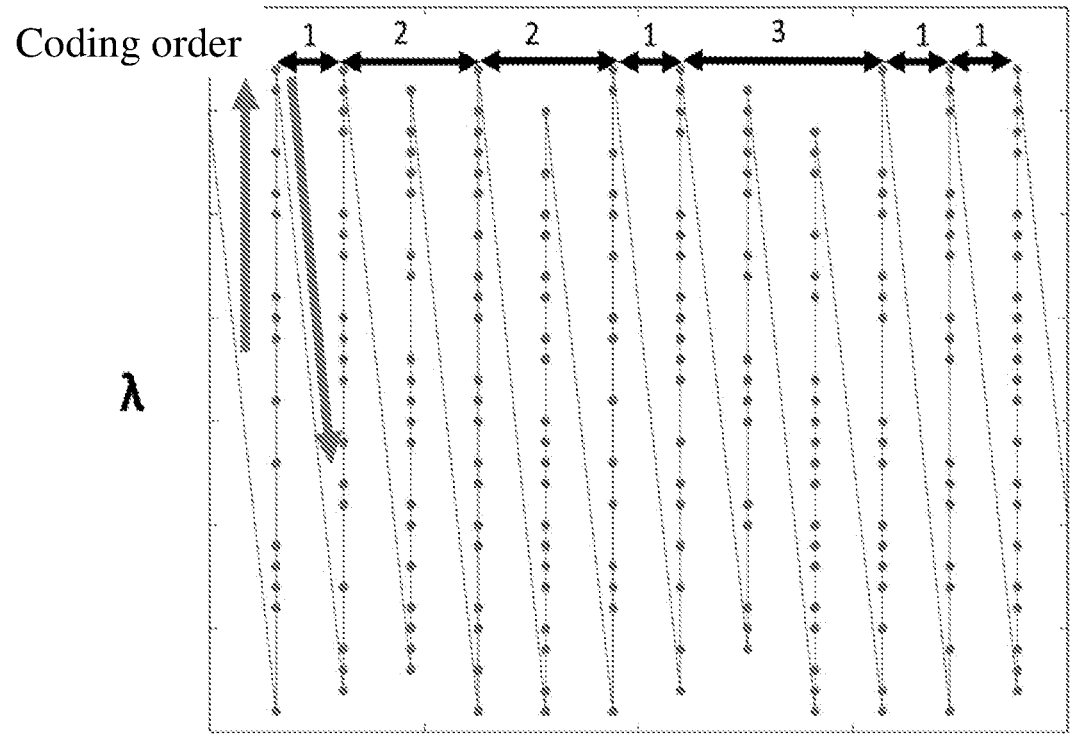
FIG. 25 illustrates an example of ordered and quantized captured points in accordance with one exemplary embodiment of the present application.

This exemplary embodiment of step 170 provides advantages because sometimes, in practice, not all points are captured at each capture time because a noise may be captured or because sensors may not be all perfectly aligned or because at least one laser beam of a Lidar sensors head may not be reflected. Captured points may then look as depicted on FIG. 24. Quantizing the azimuthal angles $\phi(P_n)$ leads to an easier discrete representation of points in the 2D coordinates ($\phi$, $\lambda$) system as depicted on FIG. 25 that allows an easier path for ordering the points of the point cloud.

The residual azimuthal angles $\phi_{res,n}$ are encoded into the bitstream B, preferably by quantizing and/or entropy-coding.

This exemplary embodiment of step 170 also reduces the dynamic of the angular angles to be encoded into the bitstream because only a residual is encoded rather than the full range value. High compression performance is reached.

Optionally, the method further includes, in step 180, the decoded azimuthal angles $\phi_{dec,n}$ are obtained based on the azimuthal angle $\phi_n$.

According to an embodiment of step 180, the decoded azimuthal angles $\phi_{dec,n}$ is given by:

$$\phi_{dec,n} = \phi_n * \Delta\phi$$

According to an embodiment of step 180, the decoded azimuthal angles $\phi_{dec,n}$ are obtained based on azimuthal angle $\phi_n$, the elementary azimuthal shift $\Delta\phi$ and residual azimuthal angles $\phi_{res,n}$.

According to an embodiment of step 180, the decoded azimuthal angles $\phi_{dec,n}$ is given by:

$$\phi_{dec,n} = \phi_n * \Delta\phi + \phi_{res,n}$$

According to an embodiment of step 180, the decoded azimuthal angles $\phi_{dec,n}$ are obtained based on the azimuthal angle $\phi_n$, the elementary azimuthal shift $\Delta\phi$ and a decoded angular residual $\phi_{dec,res,n}$ obtained by de-quantizing the quantized residual azimuthal angle $\phi_{res,n}$ given by equation 3.

According to an embodiment of step 180, the decoded azimuthal angles $\phi_{dec,n}$ is given by:

$$\phi_{dec,n} = \phi_n * \Delta\phi + \phi_{dec,res,n}$$

Optionally, in step 190, the decoded radius values $r_{dec,n}$ are obtained based on encoded radius values $r_n$.

According to an exemplary embodiment of step 190, the decoded radius values $r_{dec,n}$ is obtained by de-quantizing a quantized radius values $r_n$.

Figure 26:
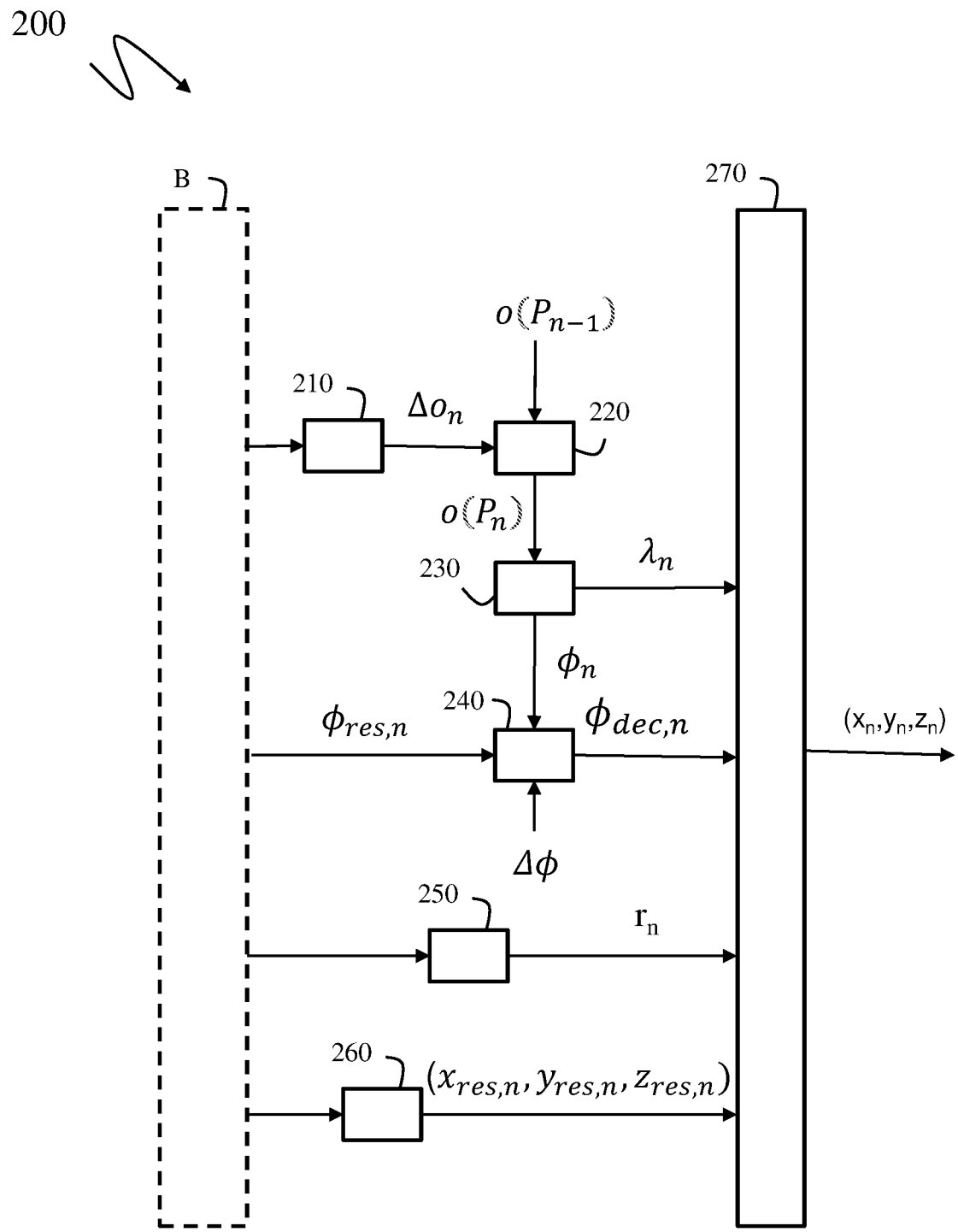
FIG. 26 illustrates a block diagram of steps of a method 200 of decoding a point cloud from a bitstream of encoded point cloud data representing a physical object in accordance with at least one exemplary embodiment.

FIG. 26 illustrates a block diagram of steps of a method 200 of decoding a point cloud from a bitstream of encoded point cloud data representing a physical object in accordance with at least one exemplary embodiment.

Decoding points of a point cloud from a bitstream B requires information such a number N of points of the point cloud, order index $o(P_1)$ of a first point in the 2D coordinates ($\phi$, $\lambda$) system, and sensor setup parameters such as the elementary azimuthal shift $\Delta\phi$ or an elevation angle $\theta_k$ associated with each sensor k. This information may also be decoded from the bitstream B or received by any other means or may be known beforehand by a decoder.

N points of the point cloud are decoded recursively.

In step 210, at least one order index difference $\Delta o_n$ (n=2 to N) is decoded from the bitstream B. Each order index difference $\Delta o_n$ is decoded for a current point $P_n$.

In step 220, an order index $o(P_n)$ is obtained for a current point $P_n$ by:

$$o(P_n) = o(P_{n-1}) + \Delta o_n$$

The order index difference $\Delta o_n$ represents a difference between an order index associated with the current point $P_n$ and another order index $o(P_{n-1})$ associated with a previously decoded point $P_{n-1}$.

In step 230, a sensor index $\lambda_n$ associated with a sensor that captured the current point $P_n$ and an azimuthal angle $\phi_n$ representing a capture angle of said sensor are obtained from the order index $o(P_n)$.

According to an exemplary embodiment of step 230, the sensor index $\lambda_n$ and the azimuthal angles $\phi_n$ are obtained by equations (1) and (2).

Optionally, in step 240, a decoded azimuthal angle $\phi_{dec,n}$ is obtained based on the azimuthal angle $\phi_n$.

According to an embodiment of step 240, the decoded azimuthal angles $\phi_{dec,n}$ is obtained based on the azimuthal angle $\phi_n$ and the elementary azimuthal shift $\Delta\phi$.

According to an embodiment of step 240, the decoded azimuthal angle $\phi_{dec,n}$ is given by:

$$\phi_{dec,n} = \phi_n * \Delta\phi$$

According to an embodiment of step 240, the decoded azimuthal angle $\phi_{dec,n}$ is obtained based on a residual azimuthal angle $\phi_{res,n}$ decoded from the bitstream B.

According to an embodiment of step 240, the decoded azimuthal angle $\phi_{dec,n}$ is given by:

$$\phi_{dec,n} = \phi_n * \Delta\phi + \phi_{res,n}$$

Optionally, in step 250, a radius value $r_n$ of spherical coordinates of the current points $P_n$ is decoded from the bitstream B.

According to an exemplary embodiment of step 250, the radius values $r_n$ are de-quantized to obtain decoded radius values $r_{dec,n}$.

According to an exemplary embodiment of step 250, the radius values $r_n$ are entropy-decoded and de-quantized to obtain decoded radius values $r_{dec,n}$.

Optionally, in step 260, a residual $(x_{res,n}, y_{res,n}, z_{res,n})$ of three-dimensional cartesian coordinates of the current point $P_n$ is decoded from a bitstream B.

According to an exemplary embodiment of step 260, the residual $(x_{res,n}, y_{res,n}, z_{res,n})$ is entropy-decoded.

Optionally, in step 270, the three-dimensional cartesian coordinates $(x,y,z)$ of the current point $P_n$ are decoded based on the decoded residual $(x_{res,n}, y_{res,n}, z_{res,n})$ of the three-dimensional cartesian coordinates of the current point $P_n$, the radius value $r_n$, the decoded azimuthal angle $\phi_{dec,n}$ and the sensor index $\lambda_n$.

According to an exemplary embodiment of step 270, the three-dimensional cartesian coordinates $(x,y,z)$ of the current point $P_n$ are the sums of the residuals $x_{res,n}, y_{res,n}, z_{res,n})$ and estimated three-dimensional coordinates $(x_{estim}, y_{estim}, z_{estim})$:

$$\begin{cases} x = x_{res,n} + x_{estim} \\ y = y_{res,n} + y_{estim} \\ z = z_{res,n} + z_{estim} \end{cases}$$

According to an exemplary embodiment of step 270, the estimated coordinates $(x_{estim}, y_{estim})$ associated with the current point $P_n$ are based on the azimuthal angle $\phi_n$ and the radius value $r_n$.

According to an exemplary embodiment of step 270, the estimated coordinates $(x_{estim}, y_{estim})$ are given by:

$$\begin{cases} x_{estim} = r_n * \cos(\phi_{\phi_n}) \\ y_{estim} = r_n * \sin(\phi_{\phi_n}) \end{cases}$$

According to another exemplary embodiment of step 270, the estimated coordinates $(x_{estim,n}, y_{estim,n})$ are given by:

$$\begin{cases} x_{estim,n} = r_{dec,n} * \cos(\phi_{dec,n}) \\ y_{estim,n} = r_{dec,n} * \sin(\phi_{dec,n}) \end{cases}$$

where $r_{dec,n}$ are decoded radius values obtained from radius values $r_n$. For example, the decoded radius values $r_{dec,n}$ may be obtained by de-quantizing the radius values $r_n$.

According to an exemplary embodiment of step 270, the estimated coordinate $(z_{estim})$ associated with the current point $P_n$ is based on the radius value $r_n$ associated with current point $P_n$ and an elevation angle $\theta_k$ of a sensor k that captured the current point $P_n$.

According to an exemplary embodiment of step 270, the estimated coordinates $(z_{estim})$ are given by:

$$z_{estim} = r_n \tan \theta_k$$

According to an exemplary embodiment of step 270, the estimated coordinates $(z_{estim})$ are also based on the sensor index $\lambda_n$.

According to an exemplary embodiment of step 270, the estimated coordinates $(z_{estim})$ are given by:

$$z_{estim} = r_n \tan \theta_{\lambda,n}$$

The overall encoder/decoder of FIGS. 21 and 26 may use a uniform quantization for the spherical coordinates $(\phi, r_{2D})$ and thus suffers from same drawbacks as the predictive tree.

The radius values $r_n$ may be adaptively quantized by the adaptive quantizer $Q_r$.

The decoded radius values $r_{dec,n}$ may be obtained by de-quantizing the quantized radius $r_n$ by the adaptive inverse quantizer $IQ_r$.

The azimuthal angles $\phi_n$ may be quantized by the adaptive quantizer $Q_\phi$.

The quantized azimuthal angles $\phi_n$ may be inverse quantized by the adaptive inverse quantizer $IQ_\phi$.

Figure 27:
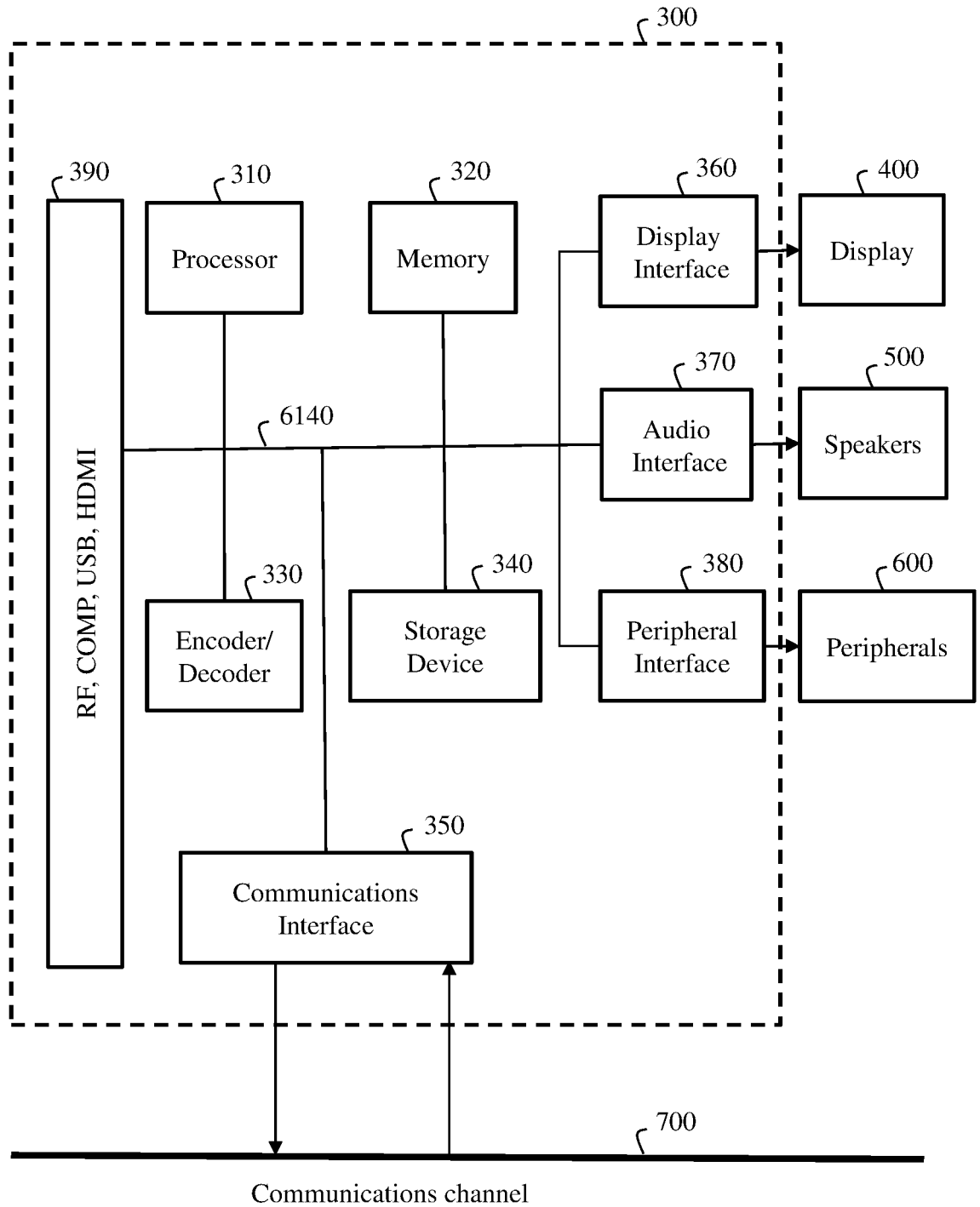
FIG. 27 illustrates a schematic block diagram of an example of a system in which various aspects and exemplary embodiments are implemented.

FIG. 27 shows a schematic block diagram illustrating an example of a system in which various aspects and exemplary embodiments are implemented.

System 300 may be embedded as one or more devices including the various components described below. In various embodiments, the system 300 may be configured to implement one or more of the aspects described in the present application.

Examples of equipment that may form all or part of the system 300 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 300, singly or in combination, may be embodied in a single integrated circuit (IC), multiple ICs, and/or discrete components. For example, in at least one embodiment, the processing and encoder/decoder elements of system 300 may be distributed across multiple ICs and/or discrete components. In various embodiments, the system 300 may be communicatively coupled to other similar systems, or to other electronic devices, via, for example, a communications bus or through dedicated input and/or output ports.

The system 300 may include at least one processor 310 configured to execute instructions loaded therein for implementing, for example, the various aspects described in the present application. Processor 310 may include embedded memory, input output interface, and various other circuitries as known in the art. The system 300 may include at least one memory 320 (for example a volatile memory device and/or a non-volatile memory device). System 300 may include a storage device 340, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 340 may include an internal storage device, an attached storage device, and/or a network accessible storage device, as non-limiting examples.

The system 300 may include an encoder/decoder module 330 configured, for example, to process data to provide encoded/decoded point cloud geometry data, and the encoder/decoder module 330 may include its own processor and memory. The encoder/decoder module 330 may represent module(s) that may be included in a device to perform the encoding and/or decoding functions. As is known, a device may include one or both of the encoding and decoding modules. Additionally, encoder/decoder module 330 may be implemented as a separate element of system 300 or may be incorporated within processor 310 as a combination of hardware and software as known to those skilled in the art.

Program code to be loaded onto processor 310 or encoder/decoder 330 to perform the various aspects described in the present application may be stored in storage device 340 and subsequently loaded onto memory 320 for execution by processor 310. In accordance with various embodiments, one or more of processor 310, memory 320, storage device 340, and encoder/decoder module 330 may store one or more of various items during the performance of the processes described in the present application. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 310 and/or the encoder/decoder module 330 may be used to store instructions and to provide working memory for processing that may be performed during encoding or decoding.

In other embodiments, however, a memory external to the processing device (for example, the processing device may be either the processor 310 or the encoder/decoder module 330) may be used for one or more of these functions. The external memory may be the memory 320 and/or the storage device 340, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), VVC (Versatile Video Coding), or MPEG-I part 5 or part 9.

The input to the elements of system 300 may be provided through various input devices as indicated in block 390. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 390 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 300 to other electronic devices across USB and/or HDMI connections. It is to be understood that various aspects of input processing, for example, Reed-Solomon error correction, may be implemented, for example, within a separate input processing IC or within processor 310 as necessary. Similarly, aspects of USB or HDMI interface processing may be implemented within separate interface ICs or within processor 310 as necessary. The demodulated, error corrected, and demultiplexed stream may be provided to various processing elements, including, for example, processor 310, and encoder/decoder 330 operating in combination with the memory and storage elements to process the data stream as necessary for presentation on an output device.

Various elements of system 300 may be provided within an integrated housing. Within the integrated housing, the various elements may be interconnected and transmit data therebetween using suitable connection arrangement 390, for example, an internal bus as known in the art, including the I2C bus, wiring, and printed circuit boards.

The system 300 may include communication interface 350 that enables communication with other devices via communication channel 700. The communication interface 350 may include, but is not limited to, a transceiver configured to transmit and to receive data over communication channel 700. The communication interface 350 may include, but is not limited to, a modem or network card and the communication channel 700 may be implemented, for example, within a wired and/or a wireless medium.

Data may be streamed to the system 300, in various embodiments, using a Wi-Fi network such as IEEE 802.11. The Wi-Fi signal of these embodiments may be received over the communications channel 700 and the communications interface 350 which are adapted for Wi-Fi communications. The communications channel 700 of these embodiments may be typically connected to an access point or router that provides access to outside networks including the Internet for allowing streaming applications and other over-the-top communications.

Other embodiments may provide streamed data to the system 300 using a set-top box that delivers the data over the HDMI connection of the input block 390.

Still other embodiments may provide streamed data to the system 300 using the RF connection of the input block 390.

The streamed data may be used as a way for signaling information used by the system 300. The signaling information may include the bitstream B and/or information such a number of points of a point cloud, coordinates or order $o(P_1)$ of a first point in the 2D coordinates $(\phi,\lambda)$ system and/or sensor setup parameters such as such as an elementary azimuthal shift $\Delta\phi$ or an elevation angle $\theta_k$ associated with a sensor of the Lidar head 10.

It is to be appreciated that signaling may be accomplished in a variety of ways. For example, one or more syntax elements, flags, and so forth may be used to signal information to a corresponding decoder in various embodiments.

The system 300 may provide an output signal to various output devices, including a display 400, speakers 500, and other peripheral devices 600. The other peripheral devices 600 may include, in various examples of embodiments, one or more of a stand-alone DVR, a disk player, a stereo system, a lighting system, and other devices that provide a function based on the output of the system 300.

In various embodiments, control signals may be communicated between the system 300 and the display 400, speakers 500, or other peripheral devices 600 using signaling such as AV.Link (Audio/Video Link), CEC (Consumer Electronics Control), or other communications protocols that enable device-to-device control with or without user intervention.

The output devices may be communicatively coupled to system 300 via dedicated connections through respective interfaces 360, 370, and 380.

Alternatively, the output devices may be connected to system 300 using the communications channel 700 via the communications interface 350. The display 400 and speakers 500 may be integrated in a single unit with the other components of system 300 in an electronic device such as, for example, a television.

In various embodiments, the display interface 360 may include a display driver, such as, for example, a timing controller (T Con) chip.

The display 400 and speaker 500 may alternatively be separate from one or more of the other components, for example, if the RF portion of input 390 is part of a separate set-top box. In various embodiments in which the display 400 and speakers 500 may be external components, the output signal may be provided via dedicated output connections, including, for example, HDMI ports, USB ports, or COMP outputs.

In FIG. 1-12, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 310 or by hardware, or by a combination of hardware and software. As a non-limiting example, the embodiments may be also implemented by one or more integrated circuits. The memory 320 may be of any type appropriate to the technical environment and may be implemented using any appropriate data storage technology, such as optical memory devices, magnetic memory devices, semiconductor-based memory devices, fixed memory, and removable memory, as non-limiting examples. The processor 310 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one exemplary embodiment" or "an exemplary embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one exemplary embodiment" or "in an exemplary embodiment" or "in one implementation" or "in an implementation", as well any other variations, appearing in various places throughout this application are not necessarily all referring to the same embodiment.

Similarly, reference herein to "in accordance with an exemplary embodiment/example/implementation" or "in an exemplary embodiment/example/implementation", as well as other variations thereof, is frequently used to convey that a particular feature, structure, or characteristic (described in connection with the exemplary embodiment/example/implementation) may be included in at least one exemplary embodiment/example/implementation. Thus, the appearances of the expression "in accordance with an exemplary embodiment/example/implementation" or "in an exemplary embodiment/example/implementation" in various places in the specification are not necessarily all referring to the same exemplary embodiment/example/implementation, nor are separate or alternative exemplary embodiment/examples/implementation necessarily mutually exclusive of other exemplary embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure. is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by a decoder. In various embodiments, such processes also, or alternatively, include processes performed by a decoder of various implementations described in this application, for example, As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to quantizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular information such a number of points of the point cloud or coordinates or order o($P_1$) of a first point in the 2D coordinates ($\phi,\lambda$) system or sensor setup parameters such as the elementary azimuthal shift $\Delta\phi$ or an elevation angle $\theta_k$ associated with a sensor k. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding a point cloud into a bitstream of encoded point cloud data representing a physical object, each point of the point cloud being associated with spherical coordinates representing an azimuthal angle responsive to a capture angle of a sensor that captured the point and a radius responsive of a distance of the point from a referential, wherein the method comprises:
   predicting an azimuthal angle associated with a point of the point cloud to obtain the predicted azimuthal angle;
   obtaining a reconstructed radius from a radius associated with the point of the point cloud;
   calculating a residual error azimuthal angle as a difference between the azimuthal angle and the predicted azimuthal angle;
   adaptively quantizing the residual error azimuthal angle based on the reconstructed radius;
   signaling the quantized residual error azimuthal angle in the bitstream to inform a decoder of a decoding mode on the bitstream; and
   transmitting the bitstream.

2. The method of claim 1, wherein the radius is adaptively quantized based on prediction of the azimuthal angle and the azimuthal angle is adaptively quantized based on the reconstructed radius obtained from adaptively inverse quantizing the adaptively quantized radius.

3. A method of decoding a point cloud from a bitstream of encoded point cloud data representing a physical object, each point of the point cloud being associated with spherical coordinates representing an azimuthal angle responsive to a capture angle of a sensor that captured the point and a radius responsive of a distance of the point from a referential, a quantized residual error azimuthal angle being signaled in the bitstream, wherein the method comprises:
   predicting an azimuthal angle associated with a point of the point cloud to obtain the predicted azimuthal angle;

obtaining a reconstructed radius from a radius associated with the point of the point cloud;

obtaining a reconstructed residual error azimuthal angle by adaptively inverse quantizing the quantized residual error azimuthal angle based on the reconstructed radius; and decoding the bitstream based on the reconstructed residual error azimuthal angle.

4. The method of claim 3, wherein adaptively inverse quantizing the quantized residual error azimuthal angle is based on an arc length quantization step.

5. The method of claim 3, wherein adaptively inverse quantizing the quantized residual error azimuthal angle comprises a first multiplication by the radius and a second multiplication by $2*\pi$, the second multiplication by $2*\pi$ being approximated by operations having equivalent result as a multiplication by 8.

6. The method of claim 3, wherein the radius is adaptively inverse quantized based on prediction of the azimuthal angle and the azimuthal angle is adaptively inverse quantized based on a reconstructed radius obtained from adaptively inverse quantizing an adaptively quantized residual error radius.

7. The method of claim 6, wherein adaptively inverse quantizing the radius comprises using a quantization step $\Delta r_{2D}$ given by:

$$\Delta r_{2D} = \Delta f(\phi_{pred}),$$

with $\phi_{pred}$ a prediction of the azimuthal angle $\phi$ and $f(\phi_{pred})$ a mathematical function having $\phi_{pred}$ as parameter;

and adaptively inverse quantizing the residual error azimuthal angle comprises using a quantization step $\Delta \phi$ given by:

$$\Delta \phi = \Delta r_{2D}/r_{2Drec},$$

where $r_{2Drec}$ is the reconstructed radius.

8. The method of claim 7, wherein the mathematical function $f(\phi_{pred})$ depends on the quantity $|\sin(\phi_{pred})|+|\cos(\phi_{pred})|$ and is given by:

$$f(\phi_{pred}) = g(|\sin(\phi_{pred})|+|\cos(\phi_{pred})|).$$

9. The method of claim 7, wherein the mathematical function $f(\phi_{pred})$ is given by:

$$f(\phi_{pred}) = 1 + \alpha(|\sin(\phi)|+|\cos(\phi)|-1).$$

10. An electronic device of encoding a point cloud into a bitstream of encoded point cloud data representing a physical object, each point of the point cloud being associated with spherical coordinates representing an azimuthal angle responsive to a capture angle of a sensor that captured the point and a radius responsive of a distance of the point from a referential, wherein the electronic device comprises:

a processor; and a memory for storing instructions executable by the processor;

wherein the processor is configured to:

predict an azimuthal angle associated with a point of the point cloud to obtain the predicted azimuthal angle;

obtain a reconstructed radius from a radius associated with the point of the point cloud;

calculate a residual error azimuthal angle as a difference between the azimuthal angle and the predicted azimuthal angle;

adaptively quantize the residual error azimuthal angle based on the reconstructed radius;

signal the quantized residual error azimuthal angle in the bitstream to inform a decoder of a decoding mode on the bitstream; and transmit the bitstream.

11. The electronic device of claim 10, wherein the radius is adaptively quantized based on prediction of the azimuthal angle and the azimuthal angle is adaptively quantized based on the reconstructed radius obtained from adaptively inverse quantizing the adaptive quantized radius.

* * * * *